United States Patent [19]
Stoner et al.

[11] Patent Number: 5,645,379
[45] Date of Patent: Jul. 8, 1997

[54] MATERIAL FLOW AND AIR-QUALITY PROTECTION, IN A PARTICULATE-MATERIAL GUN USABLE WITH SILICA FUME

[75] Inventors: David J. Stoner, Corona Del Mar; Steven L. Lang, Victorville, both of Calif.; Paul E. Sulman, Zephyr, Canada; David C. Lawrence, Upland, Calif.; Richard Ellis, Chino, Calif.; Fernando Lopez, Alta Loma, Calif.

[73] Assignee: Reed Manufacturing, Inc., Walnut, Calif.

[21] Appl. No.: 561,788

[22] Filed: Nov. 22, 1995

[51] Int. Cl.⁶ .................................................. B65G 53/00
[52] U.S. Cl. .......................... 406/67; 222/636; 222/240; 222/370; 406/63; 406/135
[58] Field of Search .............................. 222/367–370, 222/636, 240; 406/63, 67, 135

[56] References Cited

U.S. PATENT DOCUMENTS

| | | | |
|---|---|---|---|
| 3,161,442 | 12/1964 | Reed | 406/63 |
| 3,999,690 | 12/1976 | Deckler | 222/367 |
| 4,382,528 | 5/1983 | Gafford et al. | 222/367 |
| 5,094,403 | 3/1992 | Tschumi | 222/636 X |
| 5,150,991 | 9/1992 | Stoner et al. | 406/67 |
| 5,341,966 | 8/1994 | Blankmeister et al. | 222/370 |
| 5,413,256 | 5/1995 | Mitchell et al. | 222/368 |
| 5,433,519 | 7/1995 | Irsch | 222/636 X |

*Primary Examiner*—Kevin P. Shaver
*Attorney, Agent, or Firm*—Ashen & Lippman

[57] ABSTRACT

A rotary feed structure for a gunite-conveying machine includes a polymeric body to resist sticking of gunite even if the latter includes silica fume, and even if it has set. The body has chambers in a circle. Preferably the body is urethane, self-bonded to a Ni-hard wear plate to eliminate radial leakage, and the mounting, (typically holes for studs), at least in part, is integral with the plate. A metal axial spacer is preferably next to the plate, but only within the innermost radius of chambers and with a sizable wall thickness. The body is preferably a feed-bowl type, with chambers formed as generally U-shaped pockets. A gunite machine using the polymeric feed structure also has a hopper, delivery tube, support and rotation of the feed structure, compressed-air for expelling the particulate material from the chambers into the tube, and provision for transporting the hopper, tube, body, and other apparatus. Chambers are selectively sealed to the expelling device and delivery tube. Dust emission is controlled by a short fill at the expulsion end of each chamber, and selective venting of residual pressure through the air-inlet end. Remaining dust, collected by a dry bag or atomizer nozzle, is preferably recycled to the bowl. New materials and procedures are used for fabricating the polymeric body.

34 Claims, 12 Drawing Sheets

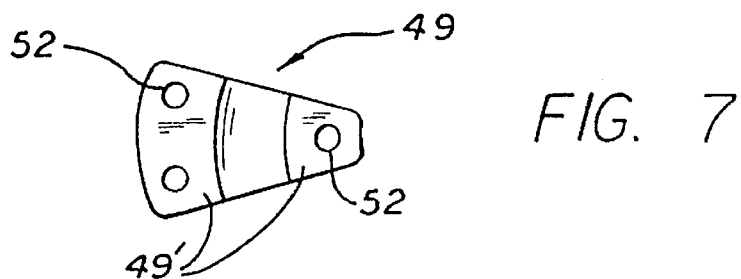
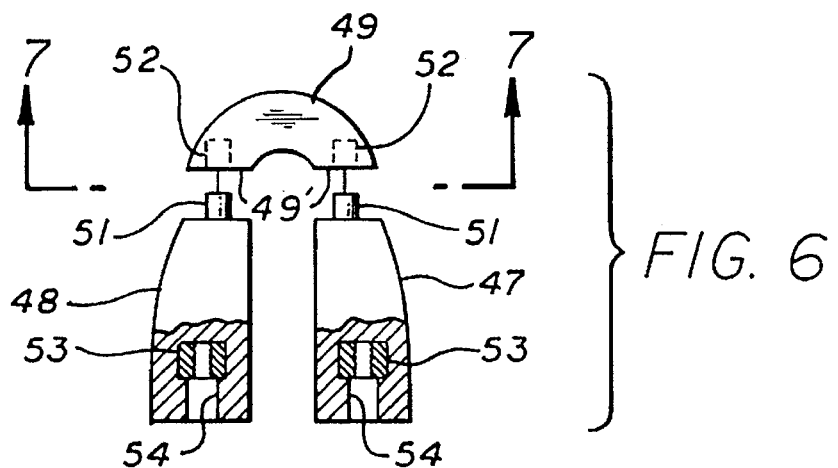
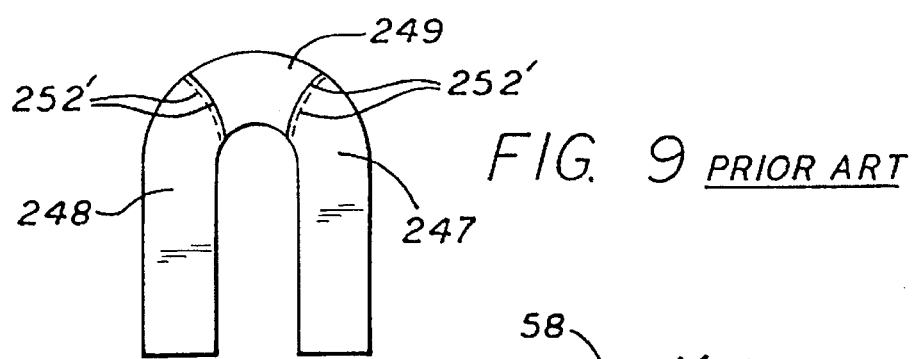
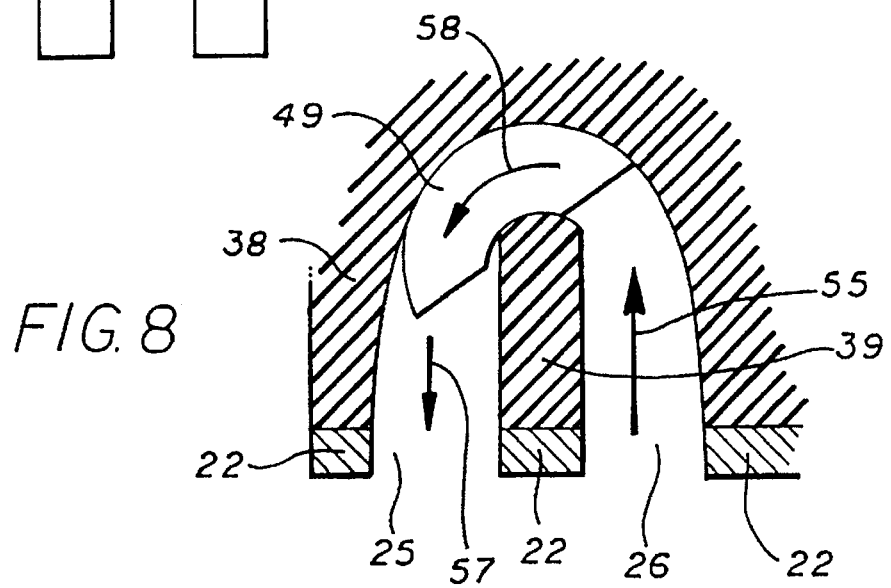

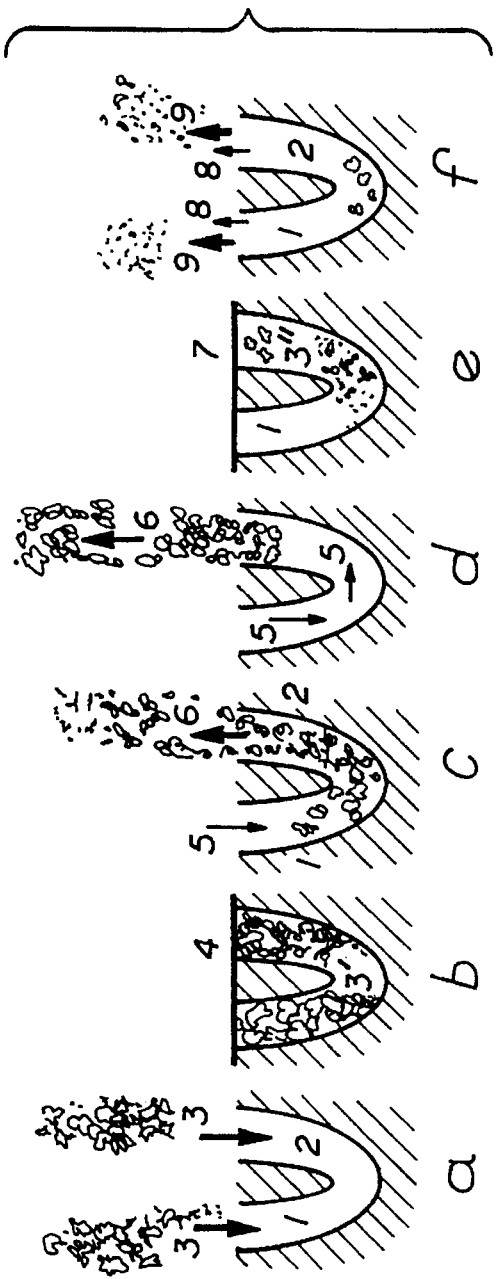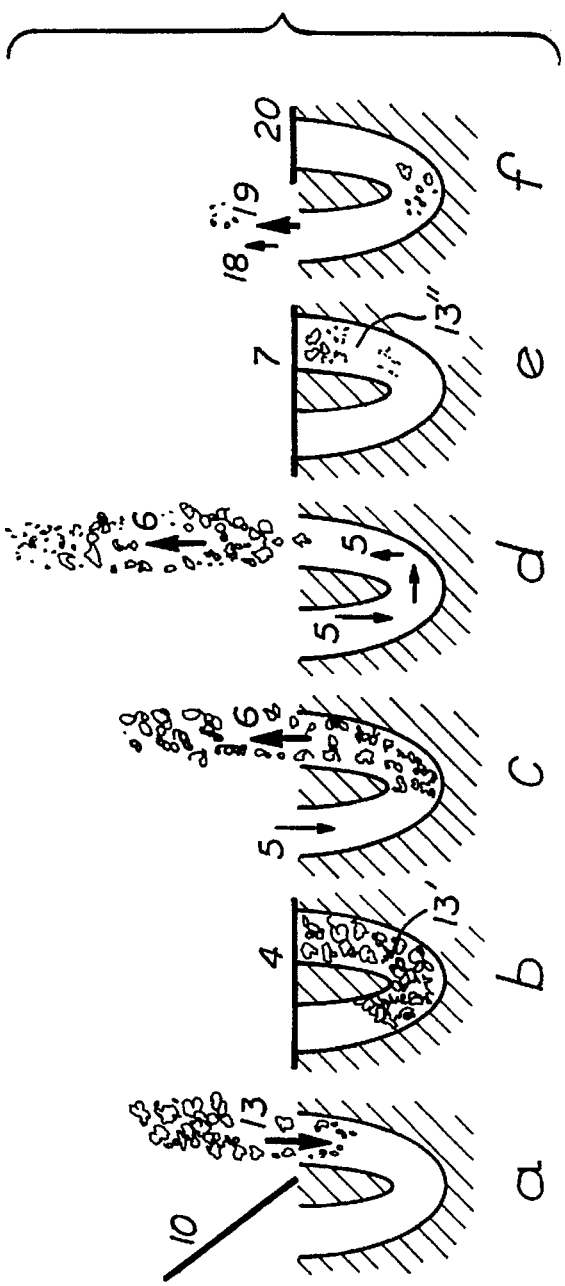

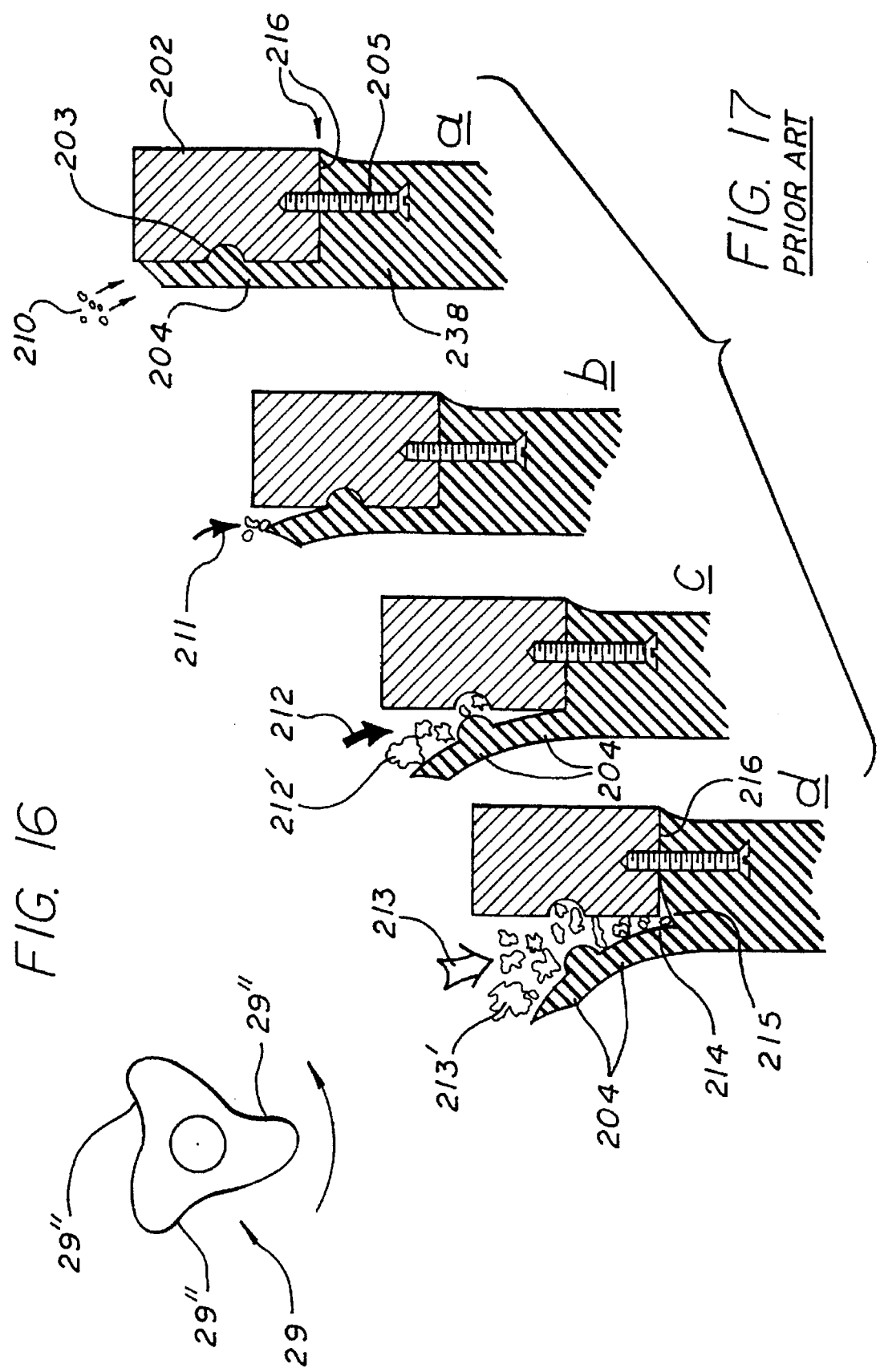

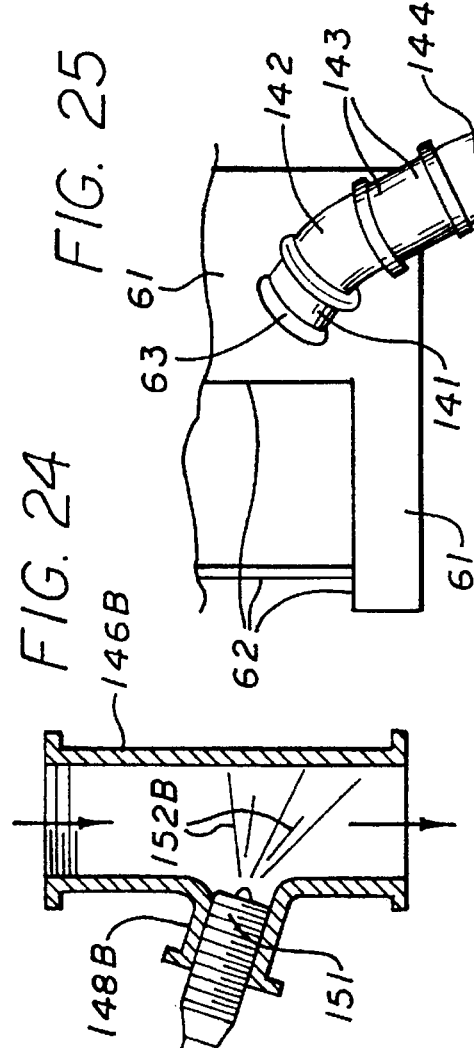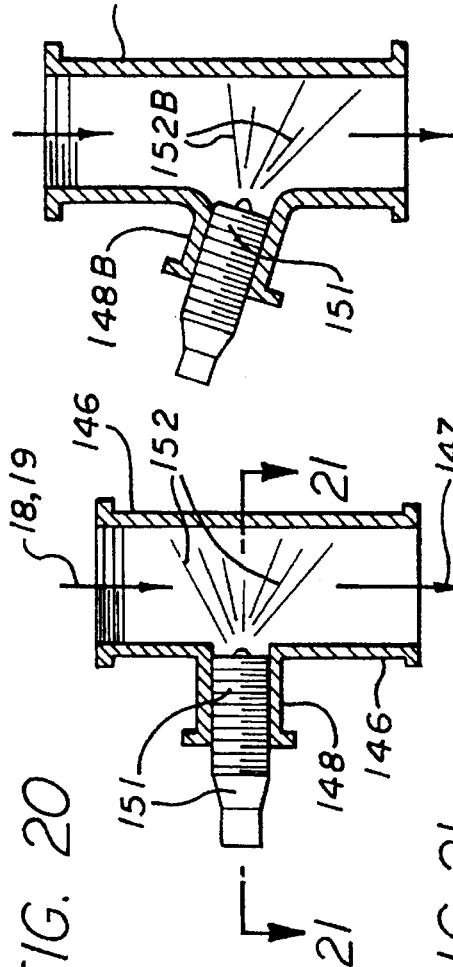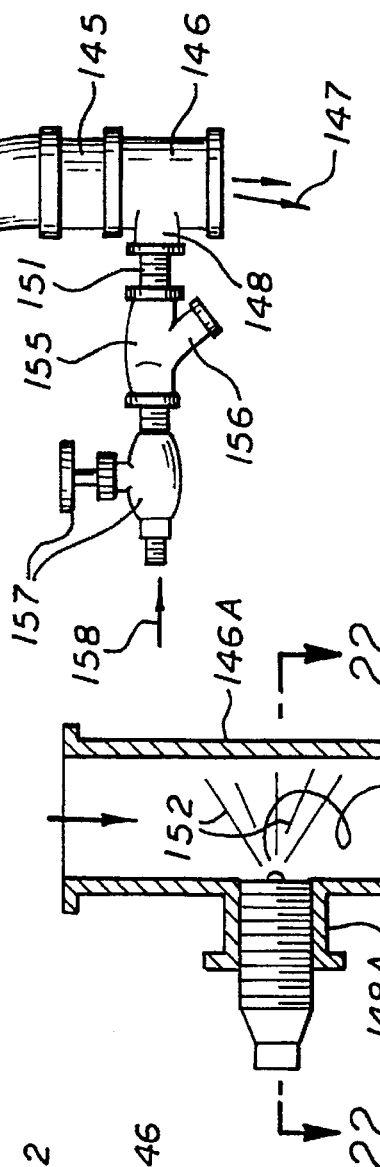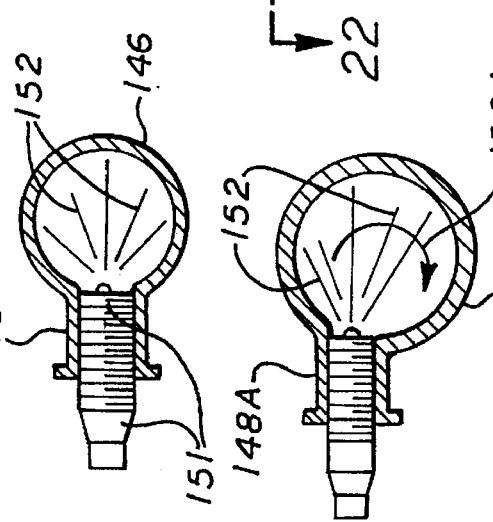

MATERIAL FLOW AND AIR-QUALITY PROTECTION, IN A PARTICULATE-MATERIAL GUN USABLE WITH SILICA FUME

BACKGROUND

1. FIELD OF THE INVENTION

This invention relates generally to apparatus for conveying particulate material (such as gunite, refractories etc.) to and through a delivery tube—and more particularly relates to such an apparatus usable with modernly favored constituents (e.g. silica fume) that are especially susceptible to clogging and to dust emission.

2. RELATED ART

Seminal work in this field is memorialized in 1964 U.S. Pat. No. 3,161,442 of Frank A. Reed. He devised a rotary feed structure in the form of a segmented rotating bowl, to carry particulate material from a hopper to a delivery tube—with compressed-air expulsion of the material from U-shaped passageways or "pockets" of the feed bowl into the delivery tube.

Strengths of Reed's system are that only one relatively small area about the expulsion station must be sealed to constrain the compressed air and the material, and gravity tends to retain the material in the bowl (thus minimizing deterioration of the seal) until the material reaches the expulsion station.

Analogous European developments aimed for different benefits, settling on a straight-through rotary structure that tends to be clog resistant (though not entirely immune) because it is gravity-assist-emptied as well as gravity-filled, and because the particulate material need not negotiate hairpin curves within the feed chambers.

The European configurations, however, are inherently bulkier vertically and employ two very large seals, at top and bottom respectively. The highly abrasive material to be dispensed is gravity-loaded against the lower seal, which is therefore subject to extreme wear.

Reed's patent is hereby fully incorporated by reference into this document, as is 1991 U.S. Pat. No. 5,150,991—coowned with the present document by Reed Manufacturing, Inc.—which introduced very important refinements directed to control of the compressed-air-and-material sealing system.

Wear Management

One refinement of these classical configurations came into use many years ago in response to experience with wear of the rotary feed structure along the face which contacts the pressure seal. Particulate matter, trapped between the metal face and the mating seal, not only attacks the elastomeric seal (requiring relatively frequent replacement of the seal) but also severely abrades the metal face.

This abrasion in time leads to irregular sharpening and gouging of various small regions, as well as overall gross misalignment, of the metal face. If these are not corrected, they both drastically accelerate the wear of the seal. Eventually the accumulated misalignment makes adequate sealing impossible even when the elastomer is new.

The generally accepted solution of these problems is a separately manufactured metal "wear plate", secured to the bowl. The wear plate is best made of a material known as "Ni-hard", which is generally twenty-six to twenty-eight percent chrome in cast iron, for maximum abrasion resistance.

The primary function of this plate, however, is perhaps not so much resistance to wear as amenability to regrinding, after extended use, for reintroducing a newly smoothed and aligned surface to engage the elastomeric pressure seal. Cast-iron structures are not generally suitable for regrinding, and in any event the cumbersome bulk and weight of a rotary feed structure would make accurate remachining much more awkward and costly.

Weight in itself is another major consideration in making the wear plate separate. Partial disassembly and cleaning of the apparatus is performed in the field relatively often, and entails lifting the plate and bowl vertically out of the apparatus housing—a difficult task for a component that in many models weighs upward of 50 kg (120 pounds).

Another wear-related problem of the prior art has to do with the metal-to-metal abutment of the wear plate and metal bowl (or other feed structure). This abutment is far from gas tight, and the air pressure used in gunite machines typically exceeds 300 kPa (40 psi) gauge.

The resulting compressed-air-driven leakage of abrasive material makes very troublesome the systematic maintenance of incidental system seals and other features. In particular a felt seal is used in the Reed-style machines to prevent gunite in the machine hopper from spilling out all around the rotary feed structure—through a clearance gap between that structure and the system housing.

In use, radial leakage of abrasive material, under pressure, between the metal surfaces chews away at the felt seal and sometimes causes failures that (although usually not functionally serious) tend to create a disorderly or messy impression. Such incidental failures in the field, often unexpected, tend to interfere with orderly maintenance programs.

Smooth Flow

Issues of susceptibility to clogging were generally put to rest for many years by careful early design of passageways in the Reed cast-iron bowl, and also by controlling the direction of loading of relatively large rock or gravel pieces. In this regard, in a Reed machine a so-called "rock cone" is sometimes disposed at the axis of rotation.

The rock cone blocks the relatively large particulate from loading into the air-input end of each chamber: in the Reed system, the input ends are arrayed closely about the axis, and the output ends are arrayed nearer the periphery of the rotary bowl. Due to the radiating geometry of the system, the input ends are much more tightly constricted; and the cone is thought to help deter mechanical jamming of heavier aggregate in these input ends.

The rock cone is longitudinally slotted, to permit finer particulate material from the hopper to pass through and load directly into the air-input end of each chamber. This finer material poses no threat of mechanically jamming the input.

Recently, however, these flow issues have reappeared because of modern developments in gunite materials. This is true, in particular, of certain materials which have entered into favor for underground work, e.g. in mines and subway tunnels, where waterproofing is critical and development of small defects can create monumental damage.

For such applications, a material that tends to fill tiny gaps and enhance waterproofing is highly prized. Just such a material, for instance, is so-called "silica fume"—finely divided and somewhat resembling talcum. Previously regarded as a waste product, silica fume is currently popular, for its characteristics just outlined, as a constituent of particulate material for underground gunite use.

Unfortunately this same material also tends to create or aggravate limitations of the original design concepts of rotary feed structures. Silica fume and like materials when slightly moist tend to adhere strongly to cast-iron surfaces, partially set, and thus build up in a delivery system and choke off the passageways in the feed structure. (We here refer to build-up on internal surfaces of the passageways, not the seal-facing surface discussed earlier in connection with abrasion.) This difficulty has been notable especially, but not exclusively, in the U-pockets of the Reed bowl.

Under field conditions, furthermore, removing the accumulated material is difficult. It can be chipped away, as for instance with a hammer and chisel—but sometimes a worker cannot plainly tell the difference between chipping gunite and chipping cast iron. In any event, as a matter of practical field operations, the efforts required to keep a rotary feed structure clear enough for effective use are often excessive.

Air Quality

A roughly parallel historical development can be traced in the area of dust control. Both the Reed and the European machines initially had a tendency to emit dust, because each feed chamber emerging from the expulsion station is still partly pressurized—typically at more than 200 kPa (30 psi).

If such a chamber rotates directly back under the particulate-material hopper to receive another load of material, this residual pressure is at least partially relieved into the hopper. It tends to blow, backward and upward out of the hopper, whatever relatively fine material is present.

This dust emission was a lesser or greater problem depending upon various factors. These included especially the specific type and dryness of material in use, duration of the application session, degree to which the work space and associated areas were confined, and sensitivity of the particular environment (for instance highway, industrial, commercial or residential) to the esthetics of dust pollution. Where the overall combinations of these factors were relatively less sensitive, dust emission was ignored.

In the relatively more sensitive combinations of these factors, some users developed their own arrangements for mitigation. Such provisions generally took the form of providing some sort of plenum or house, in a region following the expulsion station, to recapture the residual pressurization, and divert it away from the input hopper.

Dust as a pollutant, however, like clogging became a more significant problem with the advent of silica fume as a favored constituent. This material, being finely divided in the extreme, is far more susceptible to becoming airborne.

As before this occurs under the influence of air-pressure residuals after feed-structure chambers have been, in principle, pneumatically emptied. With silica fume, however, merely isolating and venting the residual pressurized air cannot adequately control the situation, because that pressurized air is now directly laden with ultrafine silica-fume silt left in the chamber at the expulsion station.

The finely divided character of this same material also renders it more susceptible to escape through relatively small passageways in the air-pressure sealing system, aggravating its pernicious tendency to float away on relatively small pressure residuals. The overall dust problem posed by silica fume is major when the material is moist, and worse when it is dry.

Therefore a necessity arises to somehow capture and deal with not only the pressurized air but also its entrained silica fume.

Prior Mitigation Work

Various efforts have been made in this field to overcome or at least reduce the problems arising from use of silica fume and the like.

As to clogging, there are materials of construction to which silica fume does not adhere. It is known that silica fume does not adhere to certain elastomeric polymers, particularly polyurethane.

With this in mind, we and others in the industry have tried a variety of approaches to exploiting this property of various elastomers. One early experiment involved connecting rubber-like tubing between the inlet and outlet apertures of a wear ring, in place of a pocket cast in solid metal. This experiment failed spectacularly as the pressurized air and gunite inflated the elastomeric tubes to the size of melons.

Attempts to reinforce the rubber-like tubing by wire-wrapping each tube failed even more ludicrously. The pressure forced the tubing to find its way out through weak spots in the wire wrap.

These efforts at least demonstrated that the overall problem of using elastomers or polymers for feed structures, though seemingly a simple task in a rather mundane industrial context, is not easy. The rotary feed structure of a gunite gun is a deceptively simple component which simultaneously handles several adverse conditions.

The feed structure must manage the interaction of high pressures, rapid flow of extremely hard abrasive materials, effective sealing to both pressure source and delivery tube, and rough handling in the field. Tampering, in effect, with this well-conceived element reveals both the effectiveness of the original conception and the extent of the challenge.

Rumors in the industry suggest that some people have tried coating with solid urethane the contoured interior chamber surfaces of rotary feed structures—or perhaps fabricating rotary feed structures with allowance for relatively thick contoured interior facings of urethane. According to such rumors, the polymeric coatings or facings quickly delaminated and were useless. We have heard no rumor of success with any such effort.

We and others have also previously tried making feed structures (FIGS. 10 and 17) of solid urethane 238, but with a metal-disc face plate 202, 206 to take the place of roughly the topmost three centimeters (inch) of a conventional cast-iron bowl. This face plate was not a wear plate. In fact, a separate wear plate 222—also as in the conventional configuration—was positioned above the metal face plate 202, 206.

The facing 202, 206 was definitely distinct from a "wear plate" not only in position and function, but also in other ways. Its hardness was much less than that of a wear plate, and perhaps was very roughly comparable to that of the cast-iron bowl whose top surface the facing was intended to emulate.

Also in our efforts along these lines, as shown in FIGS. 10 and 17, for promotion of smooth flow we undercut each interior wall of the facing to allow for the thickness of a urethane coating 204, 207. In this way we aligned the urethane surfaces 204, 207 reasonably well with the corresponding surfaces of the wear-plate 222 apertures just above.

In addition we formed a groove 203, 208 all around each interior wall of the facing 202, 206, to enhance the gripping of the metal surface by the urethane 204, 207. The urethane coating was 1½ to 3 mm (a sixteenth to an eighth of an inch) thick, and beveled at the top edges. Bonding agent was applied to the interior wall, as well as the bottom 216, of the facing 202, 206 for strong adhesion of the urethane 204, 207, 238 to the facing on both these surfaces.

In practice not only did the urethane coating 204, 207 delaminate from the interior walls of the face plate, but also the bond failed at the bulk interface 216 along the bottom of that plate. We attempted to provide still further gripping action at that surface by screwing several dozen machine screws 205 into the underside of the face plate 202, 206, before molding the urethane to it.

The idea was that the urethane would have much more structural connection to the plate through its gripping of these deeply embedded screws. Nevertheless these experimental units too failed promptly and in the same two ways—delaminating of the interior wall coatings 204, 207, and ripping apart of the two phases by failure of the bond along the bottom 216 of the facing 202, 206.

In addition to our own earlier efforts along these lines, we are aware of a similar feed structure of urethane with a bonded metal face plate, offered by one of our friendly competitors. In that feed structure, at least a quarter to two thirds of the metal-aperture faces have urethane coatings thick enough to be considered significantly more than just flash.

Evidently these coatings initially extend to the top of the face plate, but later are cut down toward the urethane bulk, using a razor knife or grinding tool. They are cut down about halfway or two thirds of the way along the height of the face-plate aperture walls. As will be explained later, we believe that this arrangement is subject to the same kind of disintegration as our own earlier urethane prototypes.

To the best of our knowledge, no customer has found these earlier urethane constructions acceptable. We consider all these prior-art efforts in urethane rotary feed structures to be virtually unmarketable.

In a later section of this document we will set forth our current understanding of the reasons for failure of the earlier devices. That analysis is not part of the present prior-art discussion, because we believe that it is part of the inventive recognitions which underlie the present invention.

As to dust generation, it was natural to attack the special problems of silica fume with familiar tools such as filters and collection chambers. Silica fume. however—by virtue of both its surprisingly high volume and its intimate association with the pressurization itself—turns out to be astonishingly difficult to manage.

Reasonably ample collection bags rapidly overfill, and persistently puff this powder through every seam and crevice. Ordinary filters, if fine enough to be at all useful, quickly clog. The material and the air which carries it are not readily separated from each other.

The resulting fine-airborne-dust problem is particularly insidious in the very environments where silica fume is most highly valued. Miners and other workers in connected cavities—even sometimes when quite remote from a gunite-shooting site—are highly vulnerable to air contamination by such fine particles.

As mentioned earlier, silica fume is particularly troublesome as to dust generation when the material is dry. In some environments this problem can be reduced slightly by using a predampening technique, which essentially consists of spraying the gunite material with quite small amounts of water in a rotating cement mixer before the material enters the hopper.

Such mitigations are not regarded as practical in the context of a mine. Gunite is typically brought into a mine in closed sacks.

Even handling of the sealed sacks of silica fume generates clouds of dust. A sack is attached to the top of the gunite-gun hopper, and then slit open by the machinery. This arrangement is considered necessary to minimize dust generation in transfer of the material from bag to hopper.

Underground operational conditions are cramped and remote, tending to militate against bringing in still an additional piece of equipment (such as a cement mixer). It is for all these reasons that in mining the technique of premoistening is considered infeasible and the dust-control problem has persisted at its worst.

Other efforts at dust control have attempted to take down the air-entrained gunite particles with a water scrubber. We are aware of some gunite-gun products, now on the market for some while, using a so-called "water ring"—a length of pipe formed into a toroid, with water holes drilled through the pipe wall facing toward the center of the toroid.

Such systems do greatly reduce the amount of dust released to the atmosphere. The amount of water used by a commercial prior-art scrubber for a gunite gun, however, is considerable.

The result is to release—usually onto the ground—correspondingly large amounts of very dilute gunite slurry. Most typically the amount of this contaminated water is excessive: it is large enough to be at least troublesome, if not somewhat impractical, to capture and haul away.

With extended operation the result is a notable mess. In unusual cases of very protracted operation, the initial air-pollution problem may even be replaced by a significant water-pollution or waste-disposal problem.

We have also noted that the commercially observed unit mentioned above has a relatively small-diameter exhaust line, terminating in an even smaller constriction. The use of a pneumatic impedance under certain circumstances can be very useful, as we shall show in later sections of this document, but in the unit discussed here the small diameter and constriction appear to contribute only back-pressure in the exhaust plenum, and therefore to be counterproductive.

Although the water scrubber has now been accepted by the gunite industry for an extended period of time, it appears to us that this acceptance has been reluctant, and essentially as a last resort. By any other measure, prior-art scrubbers create—because of the amount of water used and discharged—an unprofessional and almost slovenly impression, which would be rejected commercially were it not for the crucial need for dust control.

Thus the need for a well-contained, refined resolution of the dust-emission problem in sensitive environments has been long felt, but unmet.

As can now be seen, the related art remains subject to significant problems, and the efforts outlined above—although praiseworthy—have left room for considerable refinement.

SUMMARY OF THE DISCLOSURE

The present invention introduces such refinement, and provides solutions to the problems of the art. The invention has several independently usable main facets or aspects, though we prefer to employ them all in conjunction together to optimize their benefits.

First through Fourth Aspects

In preferred embodiments of several of these aspects or facets, the invention is a rotary feed structure. These facets or aspects have several elements in common. The common parts will be described first.

As to these first four aspects, the feed-structure invention is for use in apparatus that conveys particulate material such as gunite from a hopper to a delivery tube.

The feed structure includes a substantially polymeric body. By "substantially polymeric body" we mean to exclude rumored prior attempts to provide polymeric surfaces by merely applying coatings, or merely building facings, onto what is in essence an iron body.

The term "polymeric" itself requires some discussion. For purposes of this document, this word is used to mean "made from or as a polymer". This usage departs somewhat from the terminology in the polyurethane casting or molding industry, where "polymer" refers to chemicals before curing—that is to say, before the molding processes—and the word "elastomer" refers to the same materials after curing.

The usage adopted in this document, however, is intended to encompass use of materials other than polyurethane. Indeed it is intended to encompass use of materials other than elastomers, to the extent that any such nonelastomeric polymers may happen to be suited to successful usage for casting of rotary feed structures for gunite dispensing machinery.

According to the present invention, the high abrasive and disruptive forces arising in gunite dispensing can be withstood only by a polymeric mass which itself possesses sufficient structural integrity in particular regions. Our invention of a feed structure having a substantially polymeric body has been built and tested, and found to work well, with a body that is entirely polymeric (though preferably attached to metal pieces for certain operational purposes to be described below).

On the other hand, our phrase "substantially polymeric body" encompasses a polymeric body having in conjunction various nonpolymeric elements. For example, it would be within the scope of our invention to provide a nonpolymeric skeletal structure—analogous to reinforcing bar in masonry constructions—or nonpolymeric particulate inclusions.

Such skeletal structure might be internal, or might be in the nature of an exoskeleton. Either skeletal or particulate features might be provided for any of a great variety of purposes.

The substantially polymeric body defines multiple chambers in a generally circular array about an axis. The chambers have substantially polymeric surfaces for contacting the particulate material. (Again, "substantially polymeric" encompasses the possibility of nonpolymeric inclusions if desired for special purposes, although we prefer to provide surfaces that are entirely polymeric since this is the particular point of using a polymer.)

In addition, these first four aspects of the invention include some means for mounting the body in a particulate-material conveying apparatus, for driven rotation about the axis. As stated earlier, these enumerated features are common to all of the first through fourth main facets of the invention. Now we shall take up these facets more specifically in turn:

In the first main aspect of the invention, the rotary feed structure also includes a metal wear plate fixed to the substantially polymeric body.

The foregoing may be a description or definition of the first facet or aspect of the present invention in its broadest or most general terms. Even in such general or broad form, however, as can now be seen the first aspect of the invention resolves many of the previously outlined problems of the prior art.

In particular, as mentioned earlier, certain polymeric materials are advantageous in that silica fume and the like are much less adherent to them: polyurethane in particular has this favorable character, and we accordingly prefer to make the body substantially of polyurethane.

Such polymers, however, have most of the other desirable properties of metal feed structures: wear resistance (particularly within the passageways) equal to or better than that of cast iron, dimensional stability and tear resistance completely adequate, and cost acceptable.

Therefore, provision of a polymeric feed structure essentially eliminates the clogging problems discussed earlier—and thereby greatly facilitates use of modern materials, with their improved sealing and waterproofing capabilities. This aspect of the invention accordingly is a very important advance in the art.

As explained in a previous section of this document, however, previous efforts to provide polymeric feed structures have been unsuccessful in regard to structural integrity and stability. We have found that success can be achieved and an entirely satisfactory feed structure made by providing a metal wear plate fixed to the substantially polymeric body.

The metal wear plate, unlike the facing plate discussed earlier, directly contacts the "pad" that seals the pressurized air and gunite in the delivery path (that is, the path from air source through pockets to delivery tube).

Thus the feed structure with affixed plate resolves the problems of the prior art described above. Nevertheless there remains room for still further refinement.

We accordingly prefer to practice this aspect of the invention in conjunction with certain additional characteristics or features, for fullest enjoyment of the advantages of the invention. First, although the plate could be secured to the body in any of a great variety of ways, we prefer to bond the body and plate together.

In particular, rather than use adhesive to fix them together after complete fabrication of the body, we prefer for maximum strength and stability that the polymeric body be self-bonded to the plate. By this we mean that the body is bonded to the plate in the same physicochemical process which creates and cures the polymeric body as a structural element.

The phrase "self bonded", however, encompasses provision of special chemical aids if desired, at the forming interface between the polymeric body and metal plate, to enhance the bonding of these dissimilar materials. We strongly prefer to use such bonding agents.

As will be recalled, prior-art wear plates were not fixed to the feed structures but rather were separate. It was thought that separate manufacture was necessary because otherwise it would have been necessary to cast the metal feed structure from the same very hard material as the wear plate; this would have been expensive.

Another useful characteristic of such a separate wear plate, of the prior art, is to facilitate refacing of the portion of the feed structure that contacts the sealing pad. That portion of the structure is subject to abrasion by gunite particles trapped between the pad and feed structure, eventually leading to rapid deterioration of the pad and misalignment that can preclude effective sealing and even damage the drive components of the machinery.

Refacing removes these effects of cumulative abrasion. It is important to recognize that the present invention preserves the amenability to refacing, but with fewer faces to grind.

We have found that a polymeric feed structure integrally self-bonded to a metal wear plate can be refaced, when necessary, without separating the feed structure from the plate. This can be accomplished by taking care to avoid overheating at the feed-structure-to-plate bond surface. Holding the temperature below about 100° C. (212° F.) during the grinding process suffices to avoid debonding.

Melting and associated permanent degradation of polyurethane actually occur over a range of temperatures, and at a corresponding range of rates. The temperature just stated is selected as a slightly cautious or conservative control point, and also because it is particularly easy to both accomplish and monitor—by using water to cool the metal.

Another important function of the separateness of the prior-art wear plate, as also noted earlier in this document, is simply to distribute the weight of the feed structure and wear plate, between two components of the apparatus—so as to facilitate disassembly for cleaning etc. This characteristic is also helpful in connection with refacing.

The feed structure of the present invention, however, more than overcomes any weight disadvantage of integral construction, by virtue of the far lower density of the polymeric material. In fact the weight of wear plate and feed structure together is on the order of only half the weight of a cast-iron feed structure alone.

Now turning to the second main aspect of the invention: of course it has the common characteristics enumerated above for the first four main aspects. In addition, preferred embodiments of the second main facet or aspect have an integral metal plate, with apertures for passage of the material to be dispensed.

As will be recalled, prior attempts to make a feed structure integral with a metal plate involved bonding a polymeric coating or lining within apertures of the plate. In this second aspect of the invention, by contrast, at most polymeric flash is present within those apertures.

(In those earlier attempts, the plate was a facing or face plate, rather than a wear plate, but for purposes of the present discussion of the second main aspect of the invention the metal plate may be either. As will be seen in the next subsection of this document, in addition to the wear plate mentioned above in discussing the first major aspect of the invention, an axial metal spacer is also desired: that spacer occupies, in very general terms, roughly the location of the facing plate of the prior art.)

The foregoing may serve as a definition or description, in broadest or most general terms, of the second main facet of the invention. Even as thus broadly or generally couched, however, the invention resolves—or contributes to resolving—significant problems of the prior art.

The absence of a relatively thick coating or lining is considered significant because we believe that such coating contributed to destruction of the bond at the bottom planar interface between the polymer and metal. FIGS. 17a–d show how this is believed to have occurred.

Granules of gunite material 210, blown and scraped by the flowing gunite against the top edge of the polymeric coating 204, abrade that edge, and tend to pull it away at its bond to the interior metal wall 202 of the aperture. Once delamination has thus begun, initial particles are blown and forced by adjacent particles 211 into the small crevice between polymer and metal (FIG. 17b).

What happens next is familiar to the periodontist. The external abrasion 212 which initiated the process is combined with the internal abrasion, at the retreating bond line, by progressively larger granules 212' trapped within the deepening crevice (FIG. 17c). This combination of effects 212, 212' hastens the progress of deterioration.

Shortly the entire somewhat flexible vertical coating (or "gum") is peeled away, down to the thicker and more rigid bulk 238 of polymer below the metal plate (FIG. 17d). We believe that the coatings 204 used previously had just enough structural strength, by virtue of their thickness of 1½ to 3 mm (a sixteenth to an eighth of an inch), to act effectively as relatively stiff conduits or ramps for driving of gunite material 214 into the bond 216 below the plate, slicing the polymer from the metal—and also as levers for application of gross forces by even larger gunite particles 213' to progressively tear away at that bond point.

The initial width of the bond 216, in most areas below the plate, is only around a centimeter or less (a fraction of an inch). Therefore the progressive tearing and slicing actions soon rip away 215 the polymer entirely (FIG. 17d) from below each web or wall segment ("tooth"), and the entire structure fails.

As mentioned earlier, one competing product has quite similar construction—although the coating is not as consistently thick as in our own previous bowls, and is cut or ground down after casting. In a quarter to two thirds of the apertures, the coating is very plainly more than flash.

We believe that the remaining height of coating, in the apertures where thick coating does appear, although cut down partway is still great enough to contribute significantly to the disintegration of the planar bond below the plate. That product, we believe, is therefore subject to substantially the same failure modes as just described for our own.

Thus, as already pointed out, the second main aspect of the invention resolves important problems of the prior art. Nevertheless we prefer to practice this aspect of the invention in conjunction with certain characteristics or features that optimize enjoyment of the advantages of the aspect.

In particular, in some of the prior-art structures discussed just above, we applied bonding agent to the metal in the interior vertical walls of the apertures. We believe now that this may have been counterproductive, since it makes difficult (1) the removal of any layer of polymer that may be formed with excessive thickness (and thus strength), and also (2) the visual assessment of thickness of any such layer.

In the apparatus of the second main aspect of our invention by contrast, as already stated, at most flash is present in the interior walls of the metal plate. It is loose, as we prefer to apply parting agent—rather than bonding agent—to the vertical metal surfaces. This preference facilitates observing the thickness of flash which forms, and cutting away any relatively thick flash which we may inadvertently allow to form.

Preferably the flash is cut away before use, but we have found in testing of several units that such a step does not appear to be necessary. The flash lacks the structural strength needed to serve as a funnel or lever, and the exposed edge of the planar bond below the metal plate is therefore able to protect itself.

The thinnest coating used in our unsuccessful prior efforts was about 1½ mm (0.060 inch)—and this is consistent with the one-quarter to two-thirds of face-plate apertures in the previously mentioned competing product that have relatively thick coatings, ranging up to 3 mm (⅛ inch). By contrast, we have found that flash of ½ mm to 1 mm (0.020 to 0.040 inch) is evidently harmless. We accordingly further prefer to hold the flash thickness below about 1¼ mm (0.050 inch) for all the apertures in our metal plate. Ideally, to allow a margin of error to accommodate possible variations in bond strength and in abrasive conditions, the flash thickness should be less than about ¾ mm (0.030 inch).

Flash normally is not introduced deliberately, but rather is an artifact of the casting process, being a result of imperfect fit between pieces of the mold, or between a metal component of the finished part and pieces of the mold. In our case, flash thickness is controlled by the relative tolerances of (1) the apertures machined through the metal plate and (2) the mold cores that are positioned in those apertures to form the pockets within the bulk of the polymeric body.

Making the flash reliably less than ¾ mm to 1 mm (0.030 to 0.040 inch) is not difficult. Doing so may, however, represent a needless expense since such thin flash seems to be harmless, the thickness of the flash can now be visually assessed easily, and whatever flash is considered too thick can be cut away rather quickly if desired.

The metal plate discussed here as part of the second main aspect of the invention, whether a wear plate or not, offers a convenient means of mounting the body to the conveying apparatus. Thus we prefer that the previously mentioned mounting means be, at least in part, integral with the plate.

Now as to the third main aspect of the invention, in addition to the previously enumerated common elements we also prefer to provide a metal axial spacer. If an integrally affixed wear plate is provided according to the first main aspect of the invention, the axial spacer is held adjacent to the wear plate.

As mentioned earlier, the spacer occupies, in very general terms, roughly the location of the facing plate of the prior art. Also in very general terms the spacer serves much the same stabilizing and axial positioning functions as did the facing plate.

The facing plate, however, was a relatively large disc extended over the full circular face of the polymeric feed structure. The axial spacer of this third aspect of the present invention is limited in radial extent to lie only within the inner radius of the array of pockets in a bowl-type feed structure.

The foregoing will serve as a description or definition of the third aspect of the invention in most-general or broad terms. Even so, this aspect of the invention makes important contribution to success of the anticlogging polymeric feed structure.

More specifically, as will be seen, such a spacer tends to circumvent a slight inferiority of polymeric materials in dimensional stability, at a critical point in operation of the apparatus. Yet we prefer to practice this third aspect of the invention too with certain characteristics or features to optimize its benefits.

Preferably the spacer is at least partially embedded in the body, and the mounting means are, at least in part, integral with the spacer as well as the wear plate if both are present. As the spacer is believed to make possibly significant contribution to driving the polymeric body in rotation, so as to minimize stress on the planar joints as indicated elsewhere in this document, the character of the embedment is important.

Preferably the radial polymeric wall thickness between the spacer and the radially innermost pocket walls is not too thin, as otherwise the spacer may be ineffective in driving the polymeric body. Furthermore inadequacy of thickness could lead to failure in a manner analogous to that previously detailed stepwise for wall coatings within the metal-plate apertures.

Here an additional failure mechanism could be a tendency to break through the radially inner pocket walls at times—such as startup—when drive torque is highest. For these various reasons we prefer to make the wall thickness at least about 1½ cm (⅝ inch), and preferably more than 2½ cm (one inch).

Now as to the fourth main aspect of the invention, once again this aspect has the common features enumerated earlier for the first group of four aspects. It also has the characteristic that there is no path for radial leakage of air or particulate material between the wear plate and the feed structure body.

The foregoing may describe or define the fourth major facet of the invention, in the most general or broad terms. Even in such terms, however, the invention resolves important problems of the prior art.

As mentioned in an earlier section of this document, radial leakage of compressed air and gunite between the wear plate and body, in the prior art, has been a perennial annoyance and aggravation to orderly maintenance efforts. The present invention entirely eliminates these difficulties by eliminating the metal-to-metal gap that gave rise to them.

We prefer to implement this aspect of the invention by integrally self-bonding the feed structure to the wear plate. Other strategies, however, will occur to those skilled in the art upon study of our present disclosure.

Thus it would be within the scope of our invention to provide a separate soft-elastomeric seal between the wear plate and the metal facing of a rotary feed structure. For instance such a seal could be placed between the wear plate and a facing plate (such as used in the prior art) of a polymeric feed structure, or even between the wear plate and a face of an all-metal feed structure.

Somewhat more preferably, such a seal could be bonded to the metal facing of the feed structure, or to the bottom of the wear plate. As already stated, however, our strongest preference is that the axial leakage path be eliminated by direct self-bonding of the feed structure to the wear plate.

Other preferences as to the first through fourth main aspects of the invention are more fully discussed in the detailed-description section of this document. They particularly include making the feed-structure body a rotary feed-bowl type, with the chambers formed as generally U-shaped pockets.

Fifth through Thirteenth Aspects

In preferred embodiments of a number of its other facets or aspects, the invention is apparatus for conveying particulate material. These particular aspects or facets have several elements in common. As with the first group of aspects, the common parts will be described first.

As to these aspects, the apparatus includes a hopper and a delivery tube. It also includes a rotary feed-structure body, defining multiple chambers. The chambers are for successive rotation into positions for receiving particulate material from the hopper and positions for delivering particulate material into the delivery tube.

The apparatus also includes some means for supporting and rotating the feed structure, and some means for expelling the particulate material from the chambers into the tube. In addition the apparatus also includes some means for selectively sealing the chambers to the expelling means and delivery tube.

The apparatus also includes some means, which we will call the "transport means", for carrying the hopper, the tube, the body, and the other aforesaid means mentioned above. The transport means may be as simple as a metal skid, or at perhaps another extreme my amount to a vehicle or trailer with highway-worthy wheels and tires, running lights etc.—or may take any form intermediate between these, depending upon the practicalities of intended use.

As stated above, these enumerated features are common to all of the fifth through thirteenth main facets of the invention. There also several features which are common to a subgrouping of these facets, namely the fifth through eighth.

In the fifth through eighth main aspects of the invention, the rotary feed structure is substantially polymeric, as in the first aspect discussed earlier. The feed-structure chambers have substantially polymeric surfaces for contacting the particulate material.

Now we shall take up these fifth through eighth facets more specifically, in turn:

In preferred embodiments of its fifth main aspect, the invention apparatus includes a wear plate secured to the rotary feed structure—generally as in the first aspect discussed earlier.

In preferred embodiments of its sixth main facet, the invention includes an integral plate (not necessarily a wear plate) with at most flash in the plate apertures—generally as in the second aspect discussed earlier.

In preferred embodiments of its seventh main facet, the invention includes an axial spacer that does not extend over the entire breadth of the system but rather is only within the inner radius of chambers in the rotary feed structure—generally as in the third facet discussed earlier.

In preferred embodiments of its eighth main facet, the invention includes some means for preventing radial leakage of air or gunite between the feed-structure body and the wear plate—generally as in the fourth facet discussed earlier.

As will be understood, the invention in these fifth through eighth main facets offer benefits generally paralleling those discussed above for the first through fourth main aspects of the invention. Generally the same preferences apply as well.

The preceding paragraph concludes discussion of the fifth through eighth main facets or aspects of the invention, concerning gunite-dispensing machines with polymeric feed structures. We continue, however, with five additional aspects that concern gunite-dispensing machines—still having the common elements enumerated earlier for the fifth through thirteenth aspects.

In preferred embodiments of its ninth main aspect, the invention apparatus incorporates certain air-quality protection features. In particular, the apparatus includes some means for restricting the receiving of the material from the hopper.

For purposes of explaining these reception-restricting means, we first mention that each chamber of the feed-structure body includes a pocket, with a gas inlet and a gas outlet. The gas inlet and outlet are the points at which, respectively, pressurized gas is applied and the particulate material flies into the delivery tube.

The gas inlets are arrayed about the axis of rotation. Now with this orientation in mind, the reception-restricting means include a substantially unperforated cone disposed about the rotation axis to block the gas inlets against receiving of material from the hopper.

(We mention that the cone is unperforated to distinguish the slotted cone, mentioned previously, long used to prevent jamming of relatively larger pieces of particulate material in the gas inlets—particularly in a Reed system. The slot-perforated cone has not been associated with efforts to control dust emissions.)

The disposition of the cone about the axis, however, leaves the gas outlets substantially open for receiving of material from the hopper. In other words, with respect to the direction of gas flow through the feed-structure chambers, the restricting means operate in a way that is directionally selective.

Specifically, the restricting means not only (1) restrict the material in overall quantity, so that each chamber is only partially filled, but also (2) load the material into each chamber at the same end from which it will be expelled. Both these provisions minimize undesired generation of dust, by promoting complete exhaustion of each load of particulate material that is placed in a chamber.

As a result, less material is left over for release, as airborne dust, with the residual pressurization. The "detailed description" part of this document explains the way in which these provisions work.

Preferred embodiments of the tenth main aspect of the invention also address air quality. Here the apparatus includes—in addition to the common elements enumerated previously for the fifth through thirteenth main facets of the invention—some means for venting gas pressure selectively from the gas inlet of each chamber.

Thus it will be noted that this tenth aspect too focuses upon the directionality of air and material flow in the apparatus. We believe that selective venting of gas pressure in a rotary feed structure of a gunite machine, with respect to flow direction, is novel and not taught by the prior art.

Its benefits relate to relieving residual pressurization at a point in the system where the supply of fine particulate dust is least, thereby minimizing the amount of dust that escapes in the course of the pressure relief. (These specifics too will be set forth in the detailed-description section below. As will be seen, the selectivity need not be absolute.)

For fullest enjoyment of those benefits, we especially prefer to practice this aspect of the invention in conjunction with certain further characteristics or features. In particular we prefer that the selective vent means actually vent from each inlet while that inlet is in neither a receiving position nor a delivering position—so that the pressure is neither relieved into the material hopper nor sustained by the pressure in the continuingly-pressurized delivery line.

We also prefer to incorporate into apparatus according to this tenth facet of the invention a plenum or house such as previously introduced for control of blowback through the hopper. We reiterate, however, that by itself such a dust-recapture house or plenum is totally inadequate for control of silica-fume dust.

Where a separate pressure-relief plenum is provided, the selective venting can be provided simply by means of a baffle over the output end of the chamber. We believe that far more effective dust control can be achieved by instead venting the input end of the chamber through a port in the pressure seal; however, this may require a more extensive reconfiguration of the system, to lengthen the seal in the circumferential direction so that venting can be performed at a point that is safely isolated from the air-pressure source.

The preceding paragraph concludes discussion of the fifth through tenth main facets or aspects of the invention, with their previously enumerated common elements. We turn now to an eleventh aspect of the invention.

In preferred embodiments of this eleventh facet, the invention is apparatus for conveying certain types of particulate material which contain silica fume or the like.

Such material is in a very finely divided dry form that is particularly susceptible to clogging of the conveying apparatus. Such material is also particularly susceptible to escaping into the environment and contaminating the air.

This material has heretofore posed major obstacles both to economic and to safe application. This aspect of the invention is directly devoted to enabling fully effective use of this modern but seemingly obstinate material.

Apparatus according to preferred embodiments of this eleventh aspect of the invention includes a substantially polymeric dispensing feed structure. This structure presents particularly smooth anticlog surfaces to the clog-and-escape-susceptible material.

The apparatus also includes some means for deterring escape of that same clog-and-escape-susceptible material. These means operate by selectively venting a part of the feed structure that is relatively remote from the delivery tube.

As can now be appreciated, the fifth through eleventh main facets of the invention have in common an objective to address the dust-control problem through directionally selective control of material or pressurization.

In preferred embodiments of yet a twelfth of its major aspects, the invention addresses the dust-control problem through, instead, a technique for weighting the dust particles to facilitate their collection.

Here the invention has, in addition to the common features and characteristics listed earlier, an atomizing nozzle disposed in a dust-capture exhaust line and means for supplying water for atomization by the nozzle. Even in this broadly stated form, the invention resolves the previously outlined excess-water-disposal problems of the prior art.

The atomizer, or mister as it is sometimes called, provides very finely divided water droplets in a relatively close-spaced fog—thus making the most efficient use, on a per-volume basis, of water used. The result is a qualitatively different slurry for disposal: it is a slurry of very modest volume, with essentially the character of moist sand.

This material is readily captured in a small tray at the exhaust exit point if desired. Generally there is enough moisture present to produce setup of the slurry at least in small clumps—thereby using up essentially all the moisture and leaving loose, dry cement granules or chunks. These residues are thus soon in an innocuous and manageable form.

Accordingly in many rough industrial environments (mines, for example) the slurry may be simply deposited on the ground rather than captured, and is likely to be entirely unnoticed as well as harmless. In somewhat less-rough environments (streets, for example), if not captured at the outset the material is readily picked up, swept up, or vacuumed up when work is complete.

We prefer to practice this twelfth main aspect of the invention with certain other characteristics or features that optimize its benefits. In particular we prefer to provide a strainer, with a quickly and easily removable strainer cartridge, to protect the small orifices of the atomizer from particulate matter in the water supply—and in particular to facilitate rapid maintenance of the system by busy work crews under demanding field conditions.

We prefer to arrange the atomizing nozzle substantially flush with the inside wall of the dust-control exhaust line, facing generally across the interior of the line. To minimize back-pressure, the line itself is preferably of large diameter, such as about 5 cm (two inches) or greater, and substantially without constriction.

Other advantageous refinements include mounting the nozzle eccentrically so as to provide a swirling, spiral spray path within the exhaust line—thus extending the length of the line in which dust knockdown can occur. Similarly the nozzle, whether or not eccentric, may be angled slightly downward to further lengthen the trapping zone.

In a variant of the twelfth major aspect of the invention, the exhaust line leading to the spray device (whether or not an atomization device) is of flexible, substantially polymeric material. These characteristics respectively inhibit formation of set-up gunite dust in the exhaust line, and facilitate an operator's efforts to break up and remove any sizable gunite chunks that do form within the line.

In preferred embodiments of a thirteenth major facet, the invention has—in addition to the previously enumerated common characteristics and features—a dust-capture exhaust line. This is a tubulation for guiding residually pressurized air, and dust entrained therein, from the chambers after the chambers leave the delivering positions.

Also included in this thirteenth main aspect of the invention are some means for returning dust from the dust-capture exhaust line to the hopper or feed structure, to recycle the dust through the conveying apparatus. Even as defined in such broad terms, this facet of the invention resolves important problems of the prior art—as it eliminates or at least greatly reduces air- and water-pollution concerns that plague the prior art.

We prefer, however, to practice this aspect of the invention in conjunction with other characteristics or features that optimize its effectiveness. In particular we prefer that the apparatus also include some means defining an inner enclosure, above the gas inlets of the pockets, and generally within the hopper. This may be, purely by way of example, the unperforated rock cone mentioned earlier. In this case we also prefer that the dust-returning means comprise means for returning the dust into this inner enclosure, to drop into the gas inlets of the pockets.

Another preference is that the apparatus also include some water-scrubber means for separating the dust from the pressurized air and forming a dust slurry. In this case it is preferred that the dust-returning means include means for returning this slurry into the inner enclosure, to drop into the gas inlets of the pockets—and predampen the particulate material.

In preferred embodiments of still a fourteenth of its major aspects, the invention is a method for making a rotary feed structure—a rotary feed structure for moving particulate material such as gunite. The method includes the step of assembling a generally circular array of arch-shaped, three-part mold cores, for defining a like array of inverted U-shaped pockets to serve as particulate-material conveying chambers in the feed structure. Thus this method produces a feed structure that is of the rotary bowl type.

The assembling step includes assembling, for each three-part, arch-shaped core: (1) a pair of discrete, generally straight but very slightly tapered legs, for forming a corresponding pair of particulate-material entry and exit conduits in the feed structure; and (2) a generally flat-bottomed header that is generally circular in elevation and tapered in plan, for completing a pocket by spanning the legs to form a connecting cross-passage in the feed structure between the conduits.

The method also includes the steps of positioning an outer mold form about the periphery of the mold-core array, and positioning a central mold form at the center of the array. The two forms cooperate to create a very-generally-annular mold cavity.

(By "very generally annular" we do not mean to limit the shape to strictly toroidal or doughnut-shaped—that is, having a minor cross-section that is circular. Whereas a toroid, strictly speaking, is the locus generated by revolving a circle about an axis that is outside the circle but in the same plane, rather our phrase "very generally annular" encompasses shapes generated by so revolving a minor cross-section that is arbitrary.)

The method further includes the step of preparing a batch of polymer. Still further steps include pouring the polymer into the mold cavity, and then curing the polymer to solidify it and so create the feed structure. Another is then disassembling the forms and cores from the feed structure.

The foregoing my be a definition or description of the inventive method of the fourteenth aspect of our invention at its broadest or most general. Even as so broadly couched, however, this method resolves the previously discussed clogging problems of the prior art by providing a feed structure that is able to function effectively with modern particulate materials, particularly those favored for underground gunite construction.

Nevertheless we prefer to practice this aspect of our invention together with numerous further steps and characteristics that optimize enjoyment of the benefits of the method. In particular, various preferences related to the use of such arch-shaped cores will be discussed in the detailed-description section. The shaping and removal of these cores are in our view important to the optimum practice of the invention.

In addition we prefer that the polymer-preparing step comprise preparing polyurethane material, and particularly material commercially available as Uniroyal L-167 or B-601, or equivalent. Such material is available from Uniroyal Chemical, of North Carolina.

We consider numerous other preferences related to preparing the polyurethane important in the successful practice of our method, and we discuss them in the detailed-description section. Particularly conducive to good structural properties, as will be seen, are use of proper curative and antifoamant, and certain handling practices: weighing materials on a digital scale by hand, thorough degassing at certain points in the process, gravity-pouring by hand, and careful timing, sequencing and temperature control.

In preferred embodiments of a fifteenth of its major facets, too, the invention is a method for making a rotary feed structure for moving particulate material such as gunite. The method of this sixteenth facet is directed to making a feed structure with an integrally incorporated plate.

As will be understood, in purest principle a wear plate—or an axial spacer plate, or even a facing plate—may instead be fixed to a prefinished polymeric feed structure. (Such a structure, if of the bowl type, may for instance be made by the method of the above-discussed fifteenth aspect of the invention.) In theory such affixing maybe accomplished by any of various means of attachment such as fitting or bolting parts together, or adhesive, or combinations of these means.

Furthermore, fabricating and operating a polymeric feed structure with no wear plate at all is theoretically possible, and within the scope of certain of our appended claims. Practice of our invention in this way may perhaps require solution of new operating problems—such as sticking of the polymer against the seal, polymer deformation or even decomposition by the heat of seal friction and through abrasion by the particulate material being handled, severely uneven wear, or inadequate means of resurfacing after wear.

Polymer science may well suggest solutions to these problems, such as for example use of a highly slippery polymer, particularly in the sealing region; casting of an especially smooth and hard sealing surface; or resurfacing by casting, rather than machining, a new sealing surface. These refinements too are within the scope of our invention as defined by certain of the appended claims; nevertheless, at present we prefer providing such a plate that is an integral part of the feed structure, and to which the polymeric body is integrally self-bonded.

To this end the method of the sixteenth aspect of our invention includes the step of providing a metallic plate. If it is to be a wear plate or facing plate, it has through-apertures for passing particulate material, as well as assembly holes for mounting and securing the feed structure to a gunite-dispensing apparatus.

If it is to be a facing plate, it has no polymeric material formed along the walls of the apertures—apart from at most a thin flash. This condition for facing plates is also a preference for wear plates.

If it is to be an axial spacer plate, it is smaller in diameter than the innermost radius of the array of cores that form the pockets. In this case preferably at least 1½ to 2½ cm (five-eighths-inch to one inch) clearance is allowed between the axial spacer plate and the cores.

The method also includes the step of preparing the back of the plate for bonding by polymer. We consider several preferences in this regard—sandblasting, degreasing, and use of a bonding agent—very important to successful practice of the invention, and we describe them with specificity in the detailed-description section of this document.

In preferred embodiments of a sixteenth of its major facets or aspects, the invention is a feed structure made by the method of the fourteenth or fifteenth main aspect of the invention—or by either of these methods with any of the method preferences mentioned above and elsewhere in this document.

In preferred embodiments of a Seventeenth major aspect of the invention, the invention is a method for resurfacing a hard metal wear plate that is integral with a generally polymeric rotary feed structure for a gunite-dispensing machine. The method includes keeping the temperature of both the metal and the polymer at or below 100° C. (212° F.), and while doing so grinding the metal plate to resurface it.

As will be understood, this procedure preserves the amenability of the structure to resurfacing, without incurring risk of impairing the physical properties of the polymer in the process. Conventional grinding and other resurfacing techniques commonly entail metal temperatures much higher than those of our method. Furthermore, conventional resurfacing of wear plates entails their separation from the rotary feed structure.

We reiterate that the several major aspects of the invention, although capable of practice independently of one another, are particularly effective when practiced together, in conjunction with each other. In other words, in addition to the preferences specifically recited above, each of the major facets or aspects of the invention is preferably used in conjunction with the others.

All of the foregoing operational principles and advantages of the present invention will be more fully appreciated upon consideration of the following detailed description, with reference to the appended drawings, of which:

BRIEF DESCRIPTION OF THE DRAWINGS

FIG. 6 is an enlarged and more-detailed view, exploded and partially in section, of certain elements of the FIG. 5 tooling—particularly the portions which form the arch-shaped cores;

FIG. 7 is a bottom plan of one of the same arch elements, namely the header piece;

FIG. 8 is a fragmentary radial section of the finished feed structure, showing how each header is removed after curing of the structure;

FIG. 9 is an elevation of portions of tooling used in the prior art, and corresponding very generally to the FIG. 5 tooling of the present invention;

FIG. 11 is a highly schematic or conceptual series of radial sections through one pocket of the FIG. 1 feed structure as that pocket rotates through several successive positions and functions within the apparatus, showing the movement of particulate material and propulsive air according to the prior art;

FIG. 12 is a like view for the present invention, demonstrating the refinements and improved performance introduced by the dust-control aspects of the invention;

FIG. 16 is a plan of one variant form of an axial spacer plate that appears in section in FIGS. 4a, 4, 27 and 28;

FIG. 17 is a series (views a through d) of four cross-sectional elevations, greatly enlarged from the right end of FIG. 10, and showing a conceptualization of rapid progressive deterioration and destruction of the FIG. 10 prior-art bowl under normal conditions of attempted use;

FIG. 20 is a side elevation, in longitudinal section, of key portions of a water-misting dust-capture system that is an alternative form of the dust-control aspects of the invention;

FIG. 21 is a cross-sectional view of the same portions, taken along the line 21—21 in FIG. 20;

FIG. 22 is a like view but showing a variant eccentric-mounting form of the same portions of the water-misting system;

FIG. 23 is a view like FIG. 20 but of the FIG. 22 variant, FIG. 22 being taken along the line 22—22 in FIG. 23;

FIG. 24 is a view like FIG. 20 but showing another variant angled-mounting form of the portions of the water-misting system;

FIG. 25 is an isometric or perspective view showing the FIG. 20 through FIG. 24 portions installed, in lieu of the dry-capture features, in the FIG. 1 system;

DETAILED DESCRIPTION OF THE PREFERRED EMBODIMENTS

Figure 1:
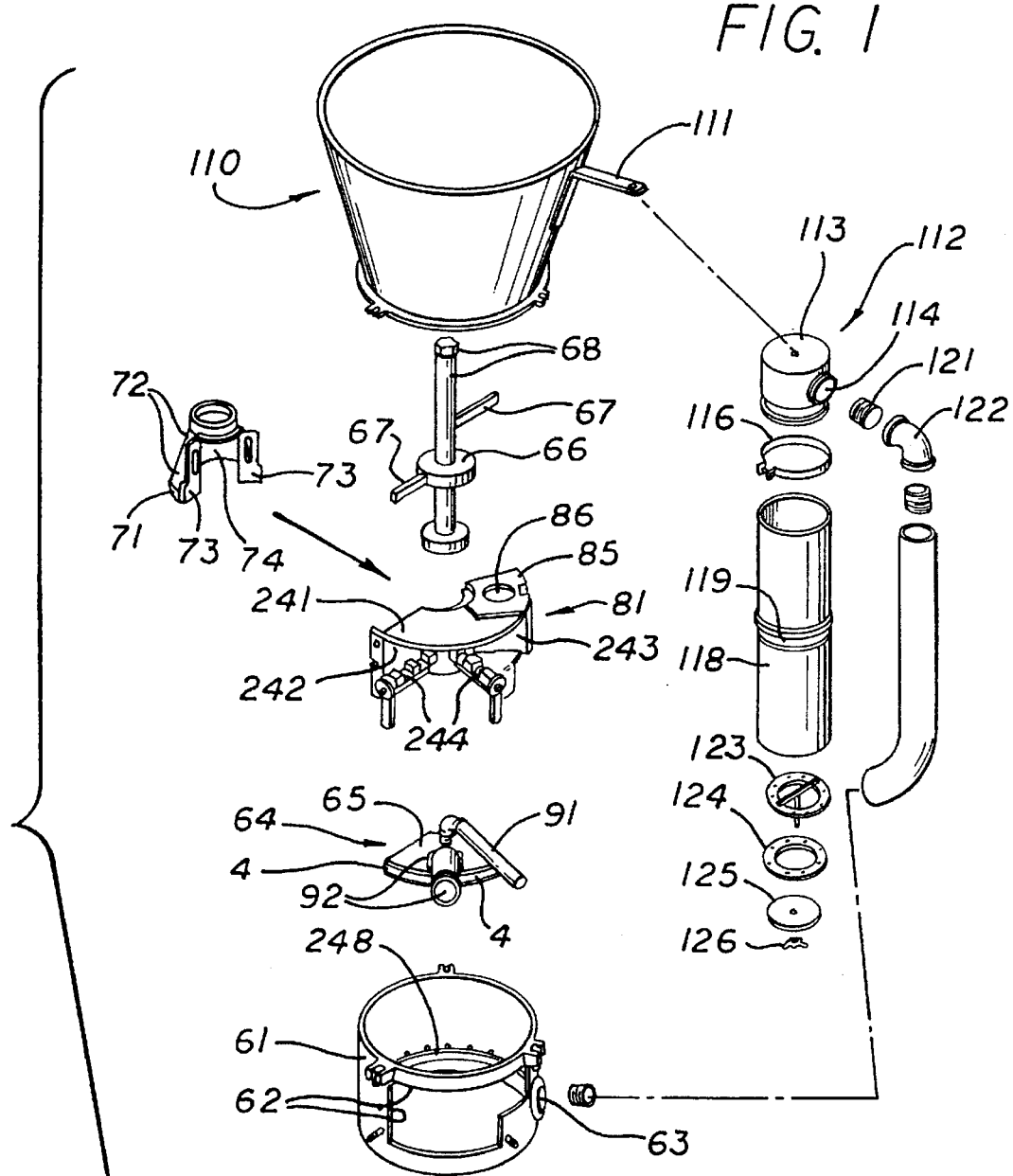
FIG. 1 is an isometric or perspective assembly view, showing major elements of the apparatus of the invention and particularly showing some relationships between the polymeric feed structure and the dust-control aspects of the invention; a portion near the lower end of FIG. 1 is drawn partially broken away to show a radial section of a rotary feed structure according to preferred embodiments of the invention—and particularly illustrating a feed structure that is of the rotary-bowl type.

A general orientation to the elements and operation of a gunite dispensing apparatus appears in the previously mentioned patents, which are wholly incorporated by reference. In the presentation of this document it is assumed that the reader is familiar with those earlier materials.

(a) Characteristics of the Polymeric Feed Structure

As FIGS. 1, 3, 4A and 4 show, a substantially polymeric feed structure 21 according to our invention is preferably (though not necessarily) of the bowl type. In general shape and function the feed bowl is very similar to its cast-iron precursors.

Thus the polymeric bowl has a circumferential array of radially aligned pockets 24–26, with bottom cross-passages 24 interconnecting the relatively central air inlets 25 with the relatively peripheral air (and material) outlets 26. Alternatively to thus focusing on the form of the voids, the pockets may be conceptualized as formed by an annular outer wall 38, a central hub region 29', and an annular intermediate separator ring 39 (which is shallower than the outer wall and central hub portions, to allow for the bottom passages 24)—all just as in the earlier metal feed structures.

In fact for prototype development we used an existing metal bowl as a male master for casting much of the surface of a mold, from which we have since in turn successfully cast prototype and production-prototype polymeric bowls for beta testing. For higher-volume production we anticipate preparing a male master from aluminum to achieve smoother mold surfaces and thereby easier, more efficient production—and also to improve dimensioning, where sensitive, by building shrinkage into the male master.

The polymeric bowl 21, like the classical cast-iron construction, preferably has a Ni-hard wear plate 22, with an even harder axle bearing insert at the center of the hub 29'. In the prior art, however, the cast-iron bowl and Ni-hard plate are bolted together; whereas we prefer that the polymeric bowl 21 be cast and bonded to the plate 22 in a unitary operation, as will be described.

In the prior art, the cast iron of the bowl hub serves to stand off the wear plate from the support ring 32 of an underlying spindle structure 31 (FIG. 1). In the present context we have encountered some difficulty in assigning this same role to an elastomeric hub, and we therefore provide a hard metal spacer 29 (FIGS. 1, 4A and 4) below the hub portion 29' of the wear plate 22.

More specifically, the spacer 29 was found necessary to preserve fine dimensional stability and alignment of the wear-plate face to the system axis. Without the spacer, excessive axial runout of the face quickly developed, amounting to some 0.4 to 0.5 mm (0.015 to 0.020 inch) or more—threatening the elastomeric seals. With the spacer 29, previously typical runout nearly an order of magnitude smaller, 0.05 to 0.08 mm (0.002 to 0.003 inch), was restored and maintained.

A central mounting hole 27, formed through both the spacer 29 and the hard insert in the wear-plate hub 29', accommodates a central axle 33 about which the bowl rotates. The bowl is driven from the spindle assembly 31 by spindle studs 35, which make a close clearance fit with stud apertures 28 also formed through the wear-plate hub 29' and the spacer 29.

Although the spacer 29 is hexagonal or octagonal—or in one prototype unit circular—and is embedded in the elastomeric body 21, we do not fully understand what part the spacer may assume in contributing torque for rotation of the body. From some perspectives it seems desirable that the spacer at least share the torque application needed to drive the elastomeric body, and therefore important that the elastomer firmly grip the polygonal spacer.

As will be recalled, certain prior-art efforts to bond a polymeric bowl to a metal faceplate failed even though extra gripping action was provided by some dozens of screws protruding from the plate into the polymer. Those early experiments suggest that the function of the spacer 29 in enhancing a firm grip is an important contribution to overall function.

Figure 19:
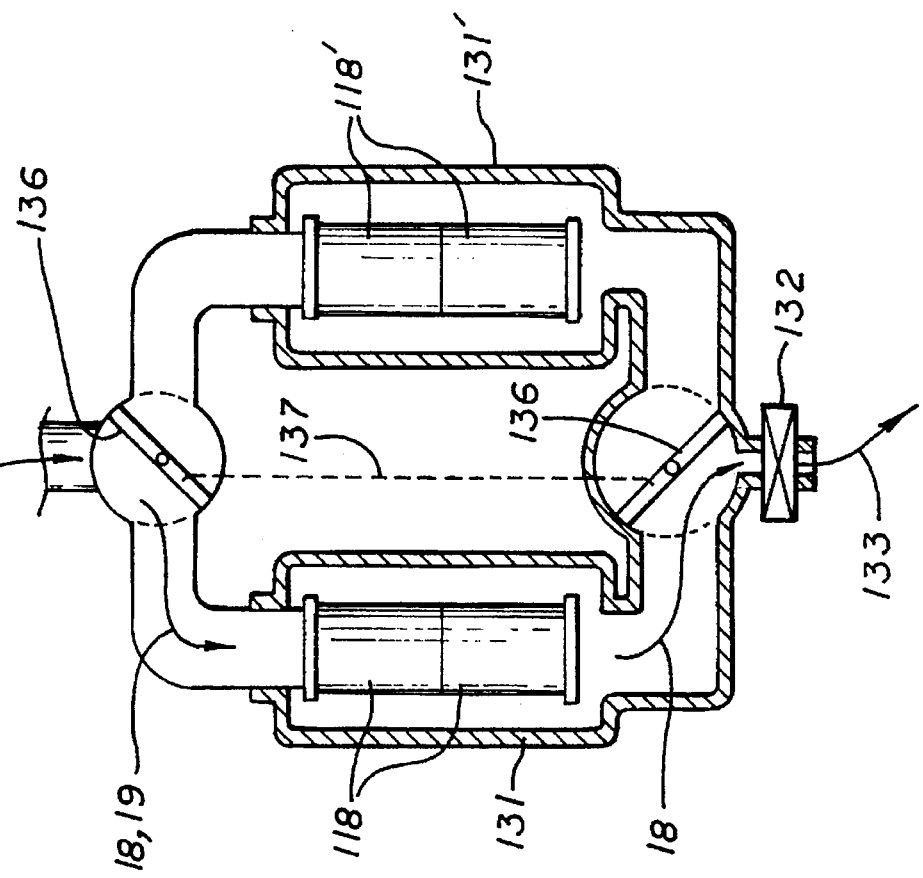
FIG. 19 is a like view for a switched-dual-bag configuration that is another important variant of the dust-capture system.

From this point of view the shape of the spacer my be quite important in helping to impel the polymer, without developing excessive localized stress. FIG. 19 represents one shape that my be optimum in helping to both grip and drive the polymer—while avoiding sharp corners that probably tend to undesirably concentrate stress within the material.

As mentioned previously, the outermost extremities of the broadly curved impeller vanes in FIG. 19, or of whatever structure makes up the spacer, preferably should be kept spaced at least 1½ to 2½ cm (five-eighths-inch to an inch) radially inward—within the bulk of the polymeric body—from the radially innermost walls of the material-conveying pockets.

From other points of view, however, it seems that the bond between the wear plate 22 and body 21 could be overstressed to failure by using up all the degrees of freedom available to the elastomer. In this analysis, very little continuing torque is required to drive the bowl with its loads of particulate material—essentially all the resistance being rather at the interface between wear plate and seal.

This line of wisdom has it that the elastomer could, and perhaps even advantageously should, be machined away from the peripheral surfaces of the spacer (or the spacer made circular, or never embedded or fixed to the polymer at all), allowing the bowl to hang more freely from its wearplate bond. In any event, to-date no such experimentation has been undertaken.

Production and beta-test prototypes continue to work well with the embedded hexagonal and circular spacers, and with no incidence of separation at the bowl-to-plate bond. As to the original motivation for attempting manufacture of the bowl from urethane, that objective has been fully met: sticking of gunite to the bowl is entirely avoided, even for gunite that includes silica fume—and, surprisingly, even if the concrete is set.

(b) Apparatus for use in Casting a Polymeric Feed Structure

Tooling for fabrication of a cast urethane bowl appears in FIGS. 5 through 8. An upper peripheral mold section 41 (drawn broken away at 43 to more clearly show a radial cross-section 42) and peripheral base 41B are fitted together.

In our preferred method which self-bonds the polymeric body to the plate, a new wear plate (not shown in FIG. 5) is prepared and positioned within the base ring 41B. The self-bonding procedure—as compared with the alternative of attaching a wear plate to the completed polymeric body—offers the advantages of fabrication convenience and an opportunity to provide extremely effective stress relief and distribution in the polymeric part.

A helpful advantage of self-bonding, moreover, is in ease of precisely locating the feed-bowl passageways and mounting holes in the urethane. All the mold pieces which establish positioning of those passages and mounting holes are simply hand-set into the actual passageways and mounting holes which have been precision-premachined in the actual wear plate that will be used with the particular bowl being cast. This simplifies the procedure and minimizes the effects of all manufacturing tolerances.

Surface preparation of the side of the plate to be bonded includes sandblasting with 60- to 80-grit alumina, driven by air at roughly 830 kPa (120 psi) gauge. This step removes oils and greases, and roughens the surface to be bonded.

Preparation also includes additional degreasing with a solution known in the industry as "fruit acid." After this step, we take care to avoid contamination of the surface: we try to keep it away from people's fingers, and even from the atmosphere, by covering with clean plastic film or sheeting.

Next a bonding agent is applied to the surface: a preferred material for this purpose is available commercially as Chemlock 218, from Lord Corporation. We allow the bonding agent to dry in a clean area for at least two or three hours—but not for too long. About two days is a maximum, as the agent otherwise is susceptible to degradation that can lead to bond failure in the field.

In final preparation for bonding, and immediately before pouring the elastomer, we preheat the wear plate, preferably for 45 minutes to an hour, at 100° to 110° C. (212° to 225° C.)—in a separate oven, to protect the plate from release agents in the atmosphere of ovens where curing is proceeding. Once again to avoid bond deterioration in the field, we are careful to avoid preheating for more than three hours; protracted preheating degrades the bonding agent.

The wear plate is positioned face down—i.e., bond-side up—within the peripheral base 41B. The peripheral base ring 41B locates not only itself but also the peripheral upper body 41 to the wear plate.

Concentricity of the bowl is important to avoid excessive vibration and seal wear in the finished apparatus. Precise centering of the central mold section 44 is achieved by inserting pegs serving as dummy studs 46 and axle 45 (taking the place of the corresponding spindle elements 35, 33, FIG. 1) into the mating holes (28, FIG. 3) in the wear plate.

Shortly before pouring, we spray silicone-base mold release on all the mold surfaces—but not on the wear-plate planar underside, where instead bonding agent has already been applied and preheated as mentioned earlier.

We do prefer to spray mold release on the vertical edges of the wear plate, not only on the exterior edge but also on the interior surfaces of the through-apertures. This step, as will be understood, precedes assembly of the core sets (see below), and we do it very carefully to avoid getting release agent on the bonding-agent-coated surface.

We also do spray mold release on the core sets themselves, after assembly to the wear plate. At this latter point, again, we are extremely careful to avoid spraying the release agent onto the bonding-agent-coated surface of the wear plate.

As noted earlier, the peripheral mold section 41 and central mold section 44 define between them a very-generally-annular mold cavity for shaping the urethane body. To include the previously mentioned spacer 29 in the integral assembly, the spacer is positioned between the wear plate and central mold section 44—above the plate and below the mold section. Naturally allowance for the to-be-embedded spacer is provided in the shaping of the central mold section.

Figure 5:
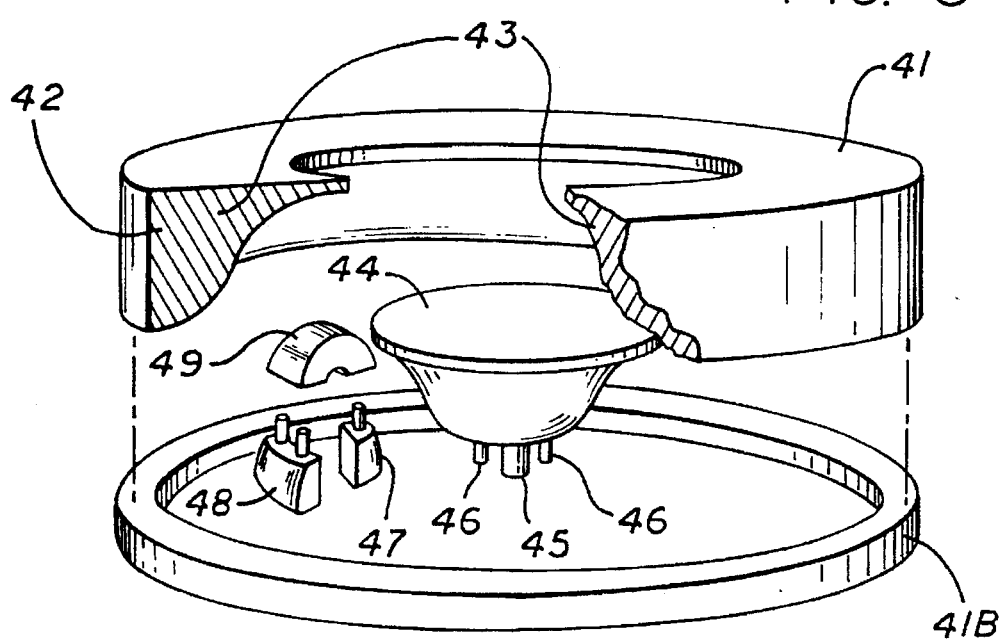
FIG. 5 is an exploded isometric or perspective view of key portions of the tooling used in practicing the method of our invention.
Figure 10:
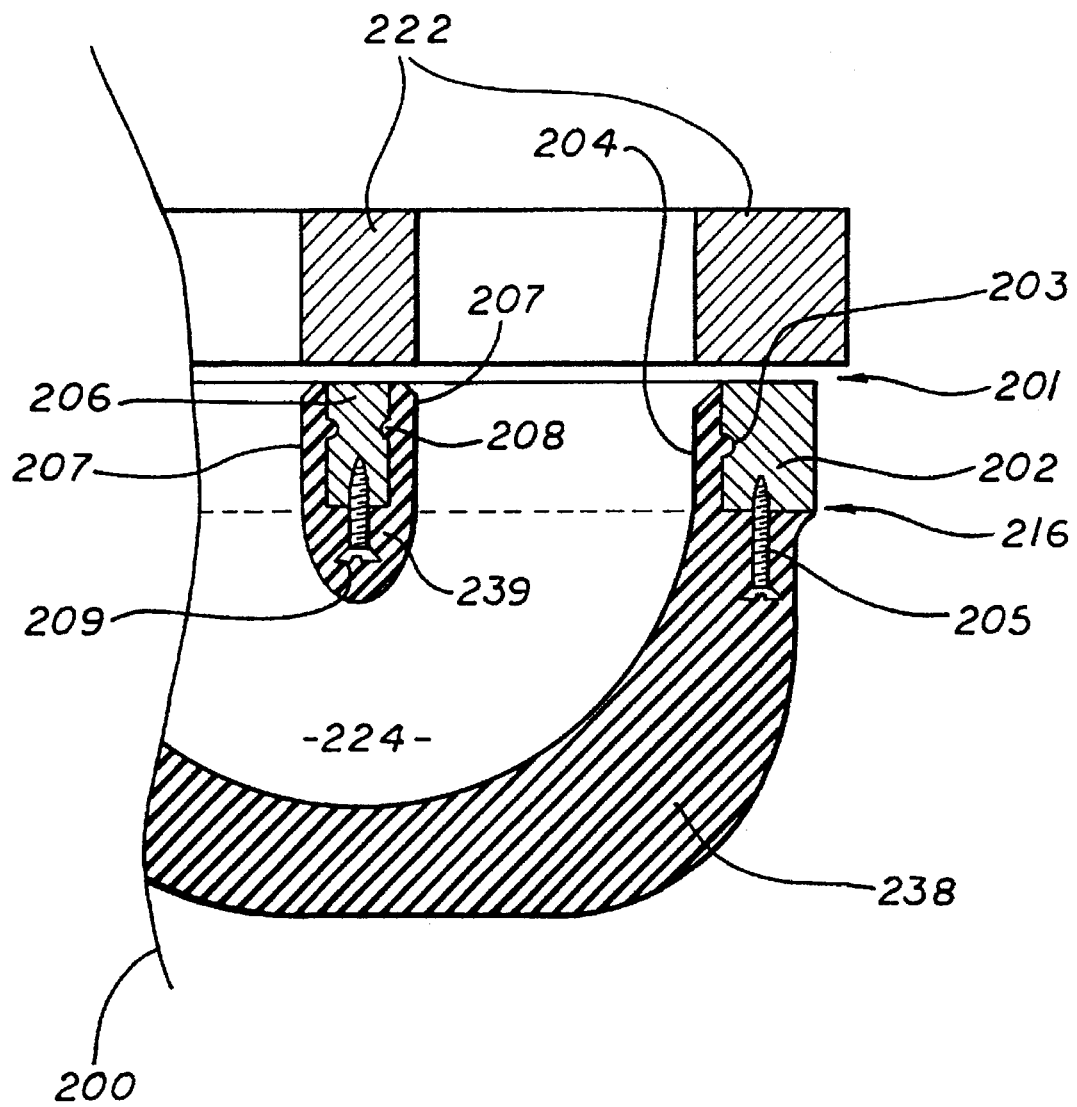
FIG. 10 is a partial cross-sectional elevation of peripheral parts of a prior-art bowl and wear plate, for comparison with FIG. 4.

FIG. 5 shows just one representative set of arch-shaped cores for forming passageways in the polymeric body. In practice a complete circumferential array of cores is assembled to occupy all the passageway holes 25, 26 (FIGS. 1, 3, 4A and 4) in the wear plate.

Each core set is made up of a pair of legs 47, 48 and a header 49. Dowel pins or pegs 51 in the legs make a tight fit with mating receptacles 52 in the header. To facilitate later extraction of the legs, they are slightly tapered and are molded with embedded nuts 53, and access holes 54 through which bolts can be inserted to engage the nuts. Air holes (not illustrated) may also be advantageously formed longitudinally through the legs. For best results the legs are preferably cured to a Shore hardness of 70A, and the header to 95A.

Each header 49 is nearly circular in elevational silhouette, as shown in FIG. 6; and wedge-shaped in plan as seen in FIG. 7. This wedge shape corresponds to a relatively narrow mating leg 47 (see FIG. 5) at the radially inward position where an air inlet 26 is to be formed, and a relatively broader leg 48 at the radially outward position where an air (and material) outlet is to be formed. Most of the bottom 49' of the header 49, and the tops of the legs 48 are all flat, providing an easily achieved tight abutment and minimal flash at the interfaces.

Previous core sets (FIG. 6a) used taller legs 247, 248 and a much narrower header section 249. The header section 249 was stabilized against both legs 248 by compound curvatures 252'. Due to their more extended longitudinal contact areas, the longer legs 247, 248 were more difficult to extract; and the compound surfaces 252' at both sides of the header 249 sometimes tended to fit poorly, leading to excessive flash.

When the mold and wear plate are ready and assembled, they are preferably placed in an oven for pouring of the polymer.

(c) Preparation of the Polymer

We consider it highly preferable in practice of our invention to use urethane of the highest grade, for best abrasion-resistance, bonding and tear properties. Uniroyal Chemical, of North Carolina, offers materials designated L-167 and B-601 which we have found satisfactory; equivalents could be serviceable.

We consider it important to mix this material with curative, preferably E-300 from Uniroyal, at a 95% theory. An antifoam agent, preferably such as material available as "Air Out 1000" from Ciba Geigy, should be included at about 1 cc per 4½ kg (10 lbs.).

For best mechanical properties of the finished article we regard it as important to hand-measure, hand-mix, and hand-pour the polymer. For measurement, we strongly prefer use of a digital scale as the ratio of polymer to additives (particularly the curative) is critical.

It is advisable to bring the material up to flowable temperature quickly as in a microwave oven, and then to thoroughly degas it by exposing it to a partial vacuum, about 98 kPa (29 inches of mercury).

Next the curing agent—as well as colorant if desired—is added and thoroughly mixed, and the material again degassed. We prefer to pour in an oven, so that the mold is up to temperature in advance and its pieces need not be disturbed once the material has been poured in. In principle other arrangements might be substituted, but this has been found to produce successfully operational bowls.

We gravity-pour in an oven at 100° to 114° C. (212° to 225° F.), watching carefully as the material flows down a rod or other surface into the mold—and adjusting the pour rate by hand to avoid trapping air in the mix. When pouring is complete we wait fifteen minutes for initial setup.

(d) Completing the Fabrication

After initial setup, we use compressed air to help pop the large mold pieces away from the finished part, and then we extract the legs 47, 48 using the embedded nuts 53. The part can then be moved to another oven if desired, or the same oven if preferred, for a sixteen-hour postcure in the same temperature range.

Next we use a mallet and a set to apply force 55 (FIG. 8), through the radially inward air inlet 26, to the header 49. The header 49 is gently tapped, as indicated by the arrow 55 to break it loose within the passage and start it into rotation—as indicated by the arrow 58—toward the radially outward air outlet 25.

By virtue of its taper (FIG. 7) the header 49 loosens as it rotates in the pocket, and eventually can be extracted straight out of the pocket as indicated by the arrow 57. The entire disassembly typically requires about twenty minutes.

Through the procedures described above, we have successfully fabricated and tested three different sizes of the roughly six distinct bowl sizes which we use commercially. Of course different molds (and in some cases different cores) are required for each size.

(e) The Restricting-Means Portion of the Dust-Control Subsystem

For orientation to portions of the overall gunite-dispensing system presented in the earlier patents mentioned above, FIG. 1 shows the main apparatus case 61, with rectangular port 62 that provides access for the pad (seal) 65, compressed-air input hose 91, and particulate-material delivery tube 92.

Below the pad 4 and pad clamping plate 65, in the bottom of the casing 61, is the rotary feed bowl 21. Cam assemblies 244 control pressure on the pad 65. To left and right of the pad 4, plate 65 and port 62 are radial walls 247, 248.

Above the clamping plate 65, within the casing 61, is a ceiling 241 which separates this region from the particulate-material input hopper. The upper and rearward portions of the casing 61 in fact form the lower part of the hopper, together with an upper funnel section 110 that hinges to the top edge of the casing. Agitator vanes 67 tend to promote consistent passage of particulate material into the bowl 21.

Above the center of the feed bowl 21, along the system axis, is the so-called "rock cone" 71–74 (see at left-center in FIG. 1) used in some prior-art units, and discussed earlier in this document. The cone is open along a forward segment 74 whose flanges 73 fit against the radial walls 247, 248.

The conical surface 72 is unperforated—whereas the corresponding surface of a prior-art cone has longitudinal slots large enough to pass most aggregate, but small enough to block pieces which might contribute to jamming in the relatively narrow air inlets 26 of the bowl 21. A prior-art cone deflects such pieces radially outward, to join particulate material falling vertically through the hopper into the outer, relatively wide air outlets 25.

The conical surface 72 of the present cone is made solid, unslotted. For retrofit purposes with respect to already-existing machines, in accordance with the present invention, the slots of a prior-art rock cone are welded shut.

The present cone has the same effect upon all particulate material as the prior-art cone has upon exclusively the large particles—namely, deflection of near-axis particles into only the outer ring of passages.

The cone 71–74 produces two major effects. First, by virtue of diverting all particles into a relatively narrow annular channel, the cone has some tendency to restrict the total flow of material from the hopper into the feed bowl 21. Thus the cone serves as restricting means, and is used to promote partial rather than complete filling of each bowl pocket.

Second, the cone loads all the material into each pocket of the bowl at the same end from which it will later be discharged to the delivery tube 92. In summary, the system according to the invention tends to produce a short fill that is exit-end loaded.

(f) The Selective-Venting Portion of the Dust-Control Subsystem

To the right of the right-hand radial wall 243 in FIG. 1 is one form of selective-venting means as described in an earlier section of this document. As shown, a separate segmentally-shaped plenum 81 is disposed in that region, within the casing 61 and above the counterclockwise-rotating (as viewed from above) feed bowl 21.

This dust-collection plenum 81 receives residual pressurized air from each pocket, as the pocket emerges from beneath the sealing pad 4. A baffle 87 is disposed at the bottom of the dust plenum 81, covering the outer ring of passageways 25 in the bowl 21.

Because of the outer-ring baffle 87, relatively little of the residual pressurization can be relieved through the radially outward end 25 of each pocket. Pressure release accordingly is primarily through the radially inward passages 26.

In other words, pressure escape is primarily in a direction opposite to the direction of air flow during the particulate-dispensing mode of operation. After leaving each pocket through its inward passage 26, the pressurized air makes its way from the plenum 85 and casing 61 through exit hole 63 in the housing 61—for collection outside the housing (see subsection [i] below).

The dust plenum 81 rests above an oiled felt sealing ring 248 which is interposed around the periphery of the system, between the top of the wear plate (just above the bowl) and a series of circumferential retaining bosses welded to the inside of the housing 61. For best operation the felt ring 248 must be tamped down from time to time, and the dust plenum 81 tends to obstruct this operation.

To permit access to the felt ring for this purpose, an auxiliary access port 86 is formed in the top of the dust plenum 81. When an operator wishes to reposition the felt seal, the operator snaps the access port 86 open and uses a long tool such as a screwdriver, wrench handle etc. to push down the baffle 87 against the felt seal 248.

(g) Operation of the Prior Art with Regard to Dust Generation

The foregoing dust-control provisions proceed from a recognition of the undesirable operation of the prior-art conveying system as diagrammed in FIG. 11. In view a, particulate material 3 falls into a representative pocket through both its air-inlet 1 and air-outlet 2 passageways.

In consequence, as shown in view b, material 3' completely fills the pocket. View b shows the full pocket after it has moved from the hopper-inlet region under the sealing pad 4, before the pocket reaches the leading edge of the expulsion station.

Next the full pocket emerges (view c) from under the pad into the expulsion station, where it passes under the compressed-air source 5. Pressurized air entering 5 the air inlet 1 blows the particulate material 6 out through the air outlet 2 as a stream into the delivery tube (92, FIG. 1).

Views d and e suggest that as the pocket approaches the end of its pressurized region—in other words, as the pocket is closed off by returning under the pad 7 at the trailing edge of the expulsion station—not all of the material 6 which is in flight manages to actually leave the pocket. A significant amount of material 3" still remains within the pocket and is trapped just inside the air-outlet end of the pocket by the resealing process.

As view e suggests, however, that residual material 3", having been trapped at the air-outlet end, is localized primarily at that end. Relatively very little of this material is in the air-inlet end of the pocket. It may be realized that these processes actually occur very rapidly, and much of the material may be pressed upward by its own momentum against the underside of the pad 7.

As the pocket emerges from under the trailing edge of the entire pad (view f), the particles that were previously moving toward the pad at the air-outlet end of the passage may not have had time to fall back into the pocket, and to a large extent may still be clustered at the outlet end.

When the pocket passes the pad 7, pressure 8 is relieved at both ends of the tube—correspondingly carrying particles 9 of dust, and some very small gravel, out of the passageway in both directions. Since the material was trapped nearer the outlet end, however, the greater bulk of the material tends to be discharged from the outlet end 2 of the passage.

(h) Operation of the Dust-Control Subsystem of the Present Invention

As shown in FIG. 12, the dust cone 10 restricts filling of each pocket to movement of particulate material 13 through the outer passageway only. Although somewhat greater pressure may be generated, the net result is a partial fill by material 13' as shown with the pocket under the leading edge of the seal 4 in view b.

Views c and d indicate that, for two reasons, exhaustion of the particulate material 6 may be correspondingly more complete: for the same air pressure, there is (1) less material inertia to be overcome, and (2) a shorter train of material to pass through the outer-passageway orifice. These observations may become more clear through detailed comparison of the drawings showing the corresponding operational phases in FIGS. 11 and 12.

Thus at view e a much smaller residual of material is trapped under the pad 7 at the trailing edge of the expulsion system. Furthermore this smaller residual may be even more strongly concentrated just immediately under the pad at the outlet end of the chamber.

Accordingly in view f when pressure is relieved, there is much less material to fly out with the pressurized air. Of at least equal importance, because the outward end of the passageway is blocked 20, almost all of that compressed air is already on the escape side of the trapped particles.

As the air 18 expands out of the chamber it can therefore carry with it very little particulate material 19: a large fraction of that little material which is still present simply falls to the bottom, where it reins until the pocket rotates back under the hopper for refilling (partial refilling) as in view a.

In summary three effects are utilized in combination to hedge dust emissions toward the smallest possible amount:

(1) a short fill, plus (2) concentration of the short fill at the outlet—to promote near-total emptying of the chamber in each cycle, with as much of the residual as possible concentrated at one end (the outlet end)—plus (3) obstruction of the end of the chamber at the end where most of the material is concentrated—to minimize the amount of material that can be downwind of the expanding, escaping air.

The system illustrated and discussed above is advantageous in that it can significantly reduce the amount of dust emitted, and particularly in that it is relatively easy to implement. The latter is true because it requires no major reconfiguration of the most touchy and massive subsystems.

Figure 2:
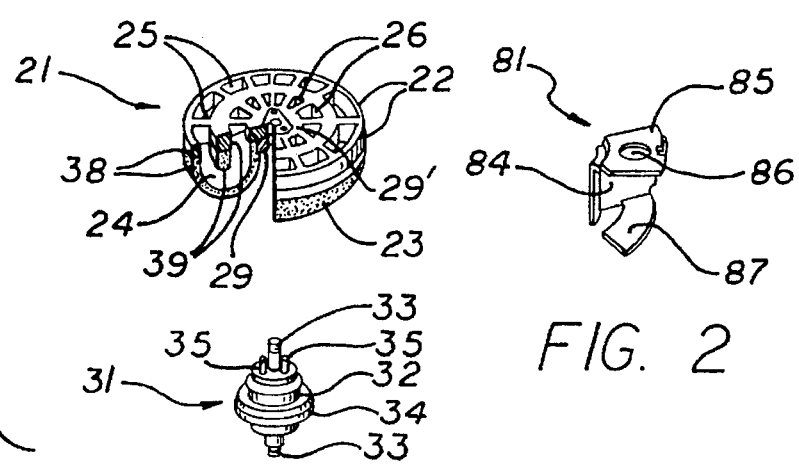
FIG. 2 is a like view showing separately a dust-control plenum subassembly, and particularly its interior—which is mostly concealed in FIG. 1—including a baffle for selective venting.
Figure 3:
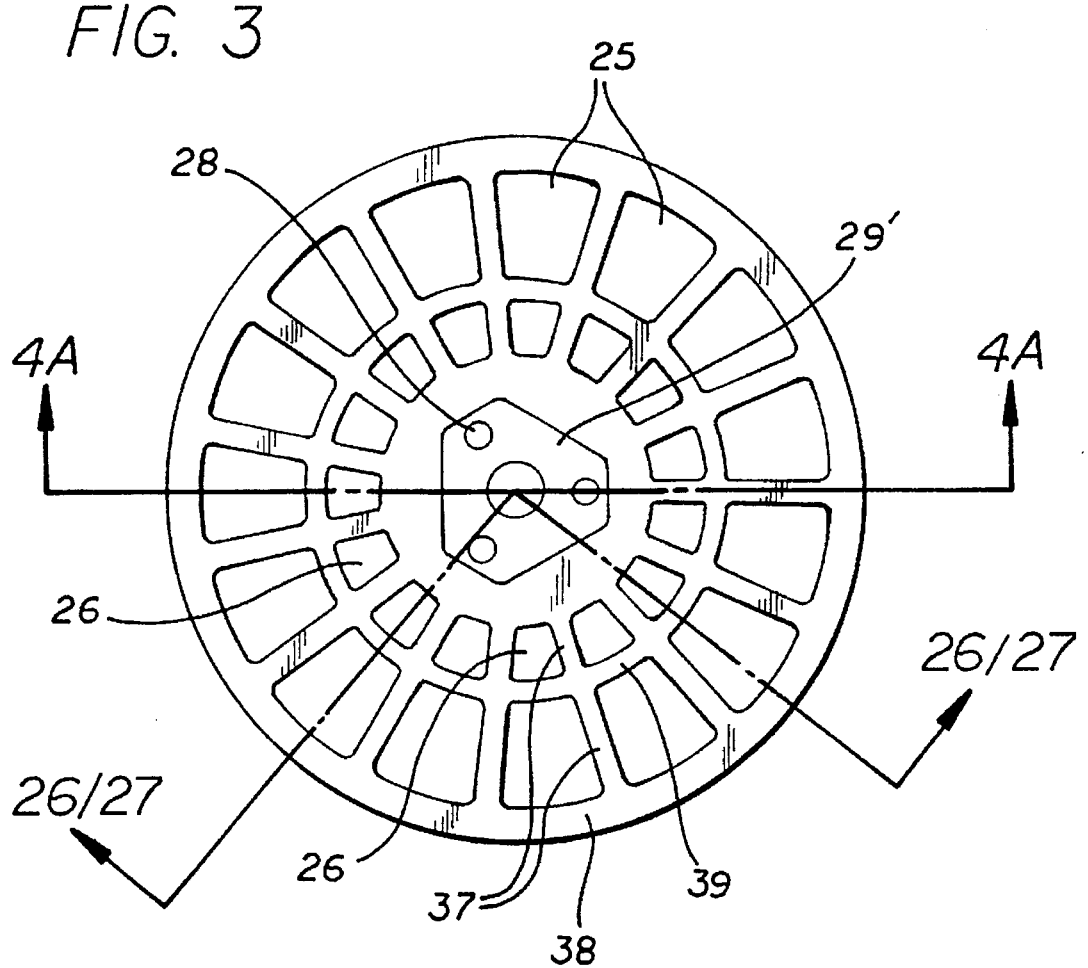
FIG. 3 is a top plan of the rotary feed structure that is included in FIG. 1.
Figure 4A:
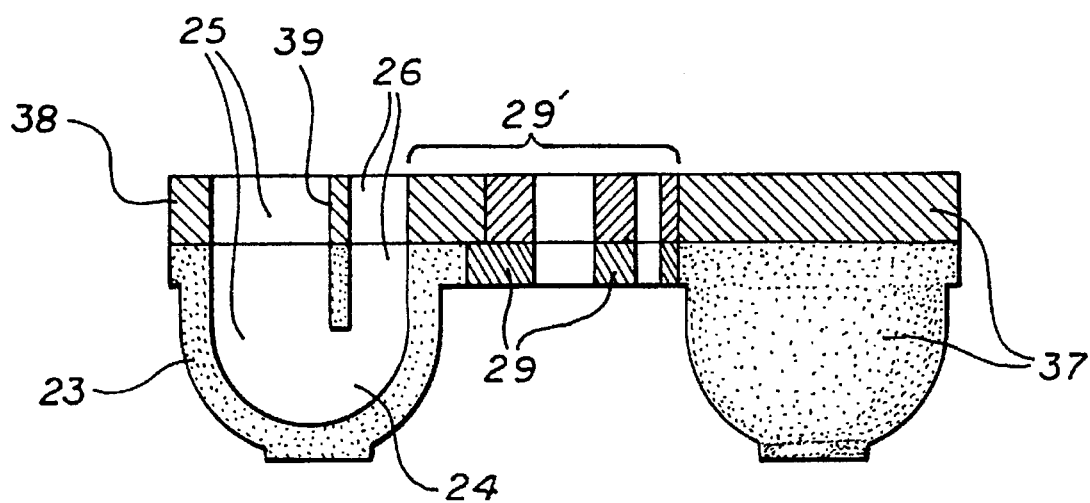
FIG. 4A is an elevation, in diametral section taken along a line 4A—4A in FIG. 3, of the same structure—particularly showing in a relatively accurate way the detailed mechanical relationships of various parts, such as for example a solid wall or "web" part that is diametrically opposite a pocket, when the feed structure has an odd number of pockets.
Figure 4:
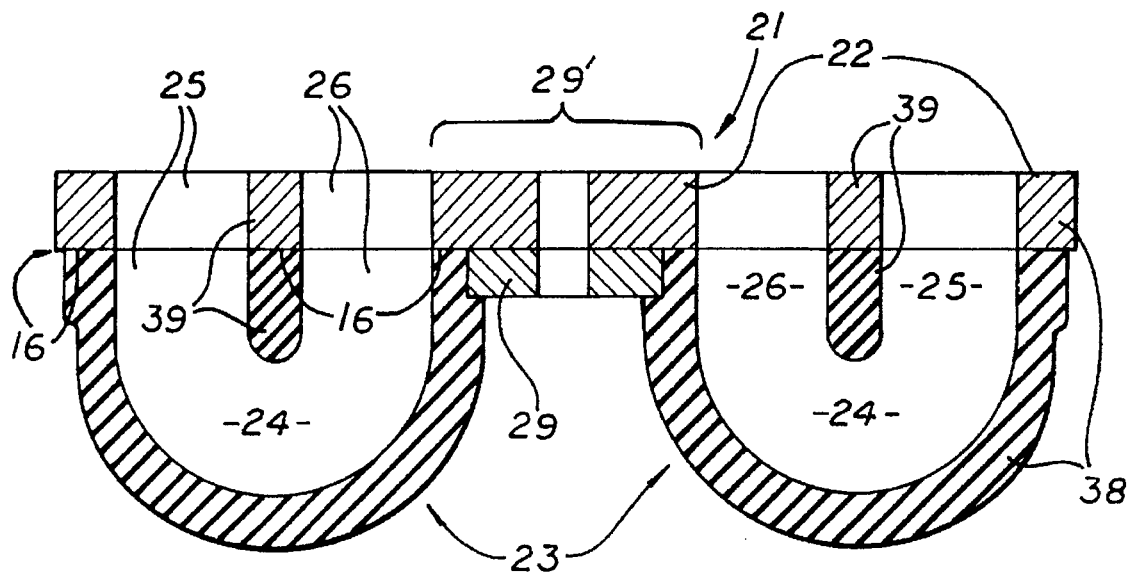
FIG. 4 is another elevation, also in diametral section, of the same structure but very simplified as to mechanical detail and proportions, and better adapted to a conceptual presentation.

The system of FIGS. 1 and 2 is imperfect, however, in that the baffle 87 inherently does not make a good seal such as symbolized at 20 in the conceptual presentation of FIG. 12, view f. Rather, the baffle 87 is outside the reach of the pad 4, 7 and simply rests loosely against the spinning wear plate.

Thus inherently a certain amount of fine material can readily escape around the edge of the baffle. This effect can be aggravated if after considerable usage a certain amount of intermediate-fine material begins to collect in the region of the baffle. Such an accumulation may tend to stand the baffle up very slightly away from the wear plate and so open a wider path for escape of silica-fume silt and the like.

Remembering that each pocket emerging from under the pad is highly pressurized, one can appreciate that this escaping stream of silica-fume silt is at high speed, and abrades the felt seal 248 that is radially just outward from the baffle. To protect the felt seal—while possibly compromising dust control to some extent—in present commercial apparatus we have elected to deliberately raise the baffle 87 about 2 to 2½ cm (¾ inch to 1 inch) above the wear plate.

We consider that this configuration retains much of the dust-suppression capability of the theoretical closely-baffled arrangement of FIG. 12f, because we believe that the wider spacing should lead to lower escape speeds—allowing a significant fraction of the pressure-driven material in the pocket to bounce off the underside of the baffle 87 and back into the pocket 24–26. Thus as previously mentioned the selectivity of venting which the baffle provides is not necessarily absolute. Our ongoing experimental program addresses this and other refinements.

Generally these phenomena at the baffle 87 are part of overall dust-control considerations, which we perceive as essentially a filtration problem—how to release pressurized air while retaining entrained material. One possible key may be to selectively lower the pressure in the radially inward part of the plenum, above the more-central pocket aperture; this may be accomplished by pumpdown in the dust/effluent receiving line—possibly combined with additional baffling within the plenum.

For example with a filter bag (see next section), pumpdown of the bag or—even installation of a fast fan or pump within the plenum itself (analogous to the fan 171 in FIG. 26), or otherwise upstream of the bag (analogous to the fans 172, 173 in FIG. 26)—may draw down the pressure in the plenum significantly toward atmospheric. As a result, it may be possible to lower the material baffle 87, to restore a close fit above the outlet aperture 26 as originally intended—without the problem of spitting air and dust toward the felt seal 248.

It is not yet clear whether air escape around the felt seal functions as a low-pressure sink, significantly adding to the tendency of the system to spit dust and air toward that seal. If so, then simply lowering the pressure, throughout the plenum, toward atmospheric should reduce the problem.

On the other hand, if experiment reveals that not much air is passing through and around the felt seal, then the pressure in that radially outward end of the plenum may be already too low—and pumpdown, by itself, in that region could aggravate the problem. If this is the case, pumpdown combined with auxiliary baffling (analogous to that at 187, FIG. 26) within the plenum to concentrate the pressure drop at the radially inward end of the plenum, above the air-inlet aperture, may efficiently draw the air out through the inlet aperture toward the exhaust line—relieving the tendency to expel material toward the felt seal and, once again, enabling restoration of the originally intended closer fit of the material baffle against the wear plate.

In any event, the system of FIGS. 1 and 2 effects an improvement of dust control that is notable but still requires a sizable external collection chamber (see following section) and rather frequent emptying—or, alternatively, a water scrubber system for bringing down the dust. Both these arrangements, while distinct improvements over the prior art, yet leave considerable room for refinement as to convenience, ease and efficiency of use, and as to overall cleanliness of operation.

Figure 13:
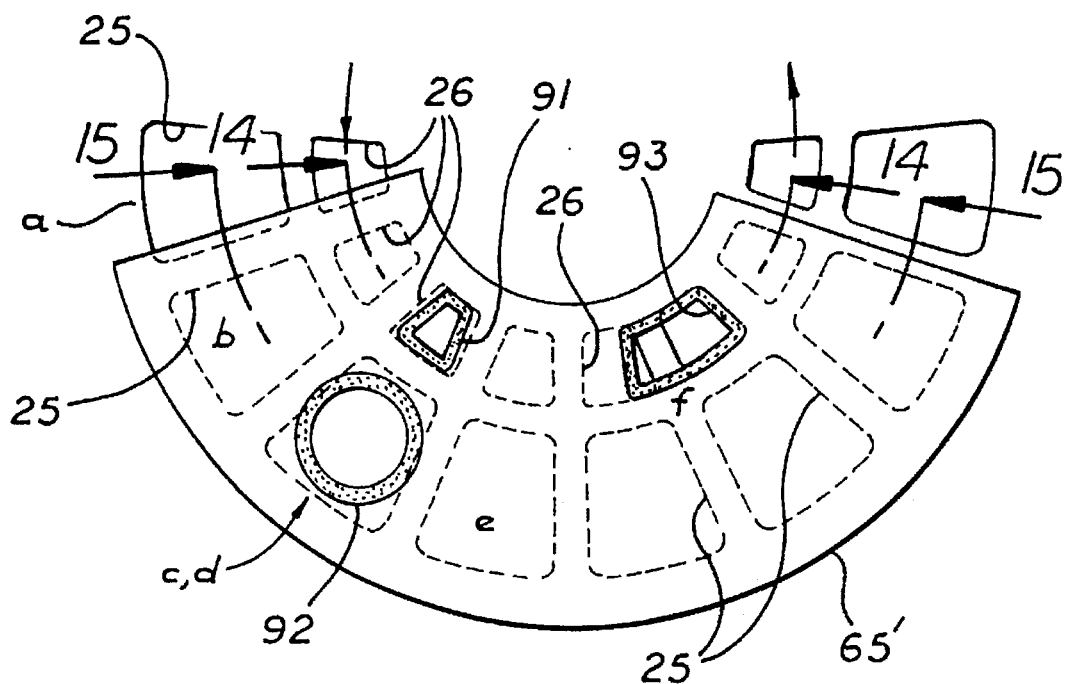
FIG. 13 is a top plan of an improved seal according to preferred embodiments of the dust-control aspects of the invention, and showing in the phantom line some of the pockets in the feed structure (keyed to FIG. 12 by letters a through f) as the pockets pass counterclockwise below the seal.
Figure 14:
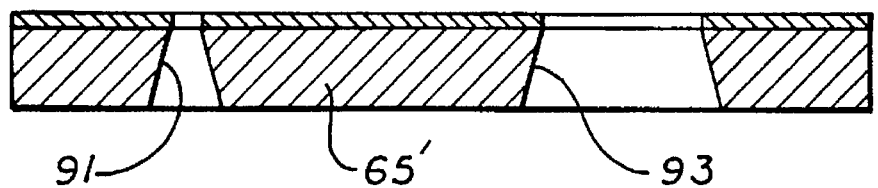
FIG. 14 is an elevation in chordal section through the FIG. 13 seal, taken along the line 14—14 (relatively near the center of rotation) in FIG. 13.
Figure 15:
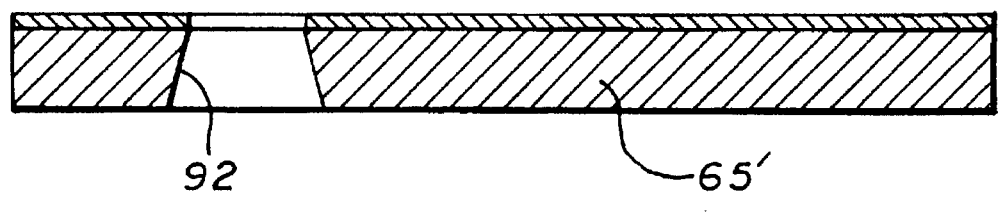
FIG. 15 is a like view taken along the line 15—15 (relatively nearer the periphery of the assembly) in FIG. 13.

Accordingly an even further improved dust-control subsystem is achievable through more effective sealing of the dust plenum against the rotating wear plate. A preferred way to do this entails integrating the selective pressure-venting path into the existing sealing-pad system, generally as shown in FIGS. 13 through 15.

Here a common seal is used for the pressure inlet 91, main pressure and material outlet 92, and residual pressure relief duct 93. The dust-control system can be continued with either an internal plenum, just above the pad, or a direct connection from this residual relief duct to an external collection container.

Preference for one or the other of these two variations depends upon the degree of cleanup achieved, relative to the degree of cleanup required. With dust reduction by perhaps another order of magnitude or two, an internal plenum and even a small cartridge filter may become practical. If a lesser degree of control is the best achievable, an external collection system may still be required (see following subsection).

With either of these variants, the integrated-seal approach calls for major redesign, as the pad must be longer circumferentially. This lengthening appears necessary, to avoid high-pressure leakage to the dust-control system—the residual-pressure recapturing subsystem would be badly swamped out if serious input-pressure bypass across the seal could develop.

With this lengthening, possibly a near-doubling of the overall pad length, the pad-clamping subsystem too would have to be correspondingly reconfigured, rebalanced, and subject to protracted testing. The system of FIGS. 13 through 15 thus my represent a longer-term solution for careful attention.

(i) Dry Collection of Resulting Dust Residual

The dust-control system of FIGS. 1 and 2, though representing a considerable improvement, leads to accumulation of a significant amount of residual material. The amount is sizable enough to require either a water-scrubbing system or an external dust-collection chamber.

FIG. 1 shows the latter approach, including a mounting bracket 111 for securing the chamber near the top of the hopper funnel. Bolted to the bracket 111 is a filter-bag header 112, with a threaded mounting hole for the bracket bolt.

Threaded into the side of the header 112 are a nipple 121 and elbow 112, for use in connecting a hose (not shown) to suitable fittings (not shown) at the plenum and casing exit holes 83, 63. The bottom of the header terminates in a clamp-type bag fitting 115, to which a clamp 116 secures a generally tubular canvas filter bag 117.

An open ring 123 with welded retaining bolt is permanently secured to the bottom of the filter bag, and a stiffening ring is captured within a cuff 119 at about the midpoint of the bag. A seal 124 and cap 125 are held by a wing nut 126 to the welded retaining bolt and ring 123.

In use the bag may be pressurized as high as one or two atmospheres gauge. Air passes through the pores of the bag while silica fume and coarser material primarily remain in the bag. Periodically the system must be shut down while the bag is emptied, but this typically takes only a couple of minutes and ordinarily can be conveniently timed to coincide with resupply of the hopper 110, 61, or sometimes with pad replacement, or with some other supply or maintenance function.

Figure 18:
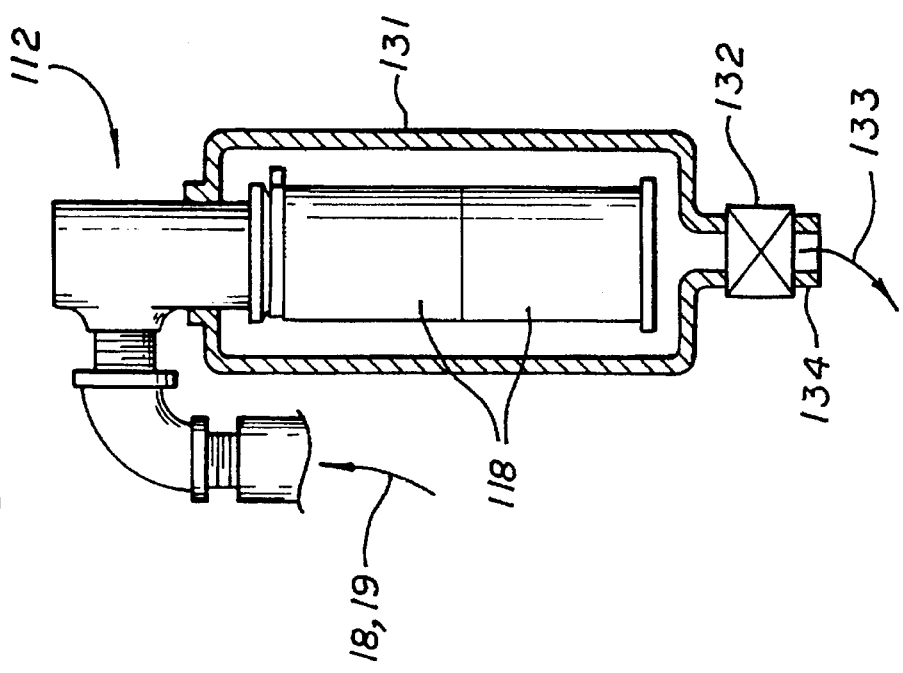
FIG. 18 is an elevation, partly in section, of portions of an evacuated-canister dust-capture system that is an important variant of the dust-capture system appearing in FIG. 1.

FIG. 18 illustrates an alternative configuration. Here the bag is enclosed in an outer canister 131, as in a common vacuum cleaner, and the canister is pumped down as by a fan-type pump or other pump 132, exhausting the air 133. The objective is to draw down the pressure in the entire system, back to the plenum 81—for purposes of protecting the felt seal 248, as described in the preceding subsection of this document. As mentioned there, blowers, baffling or other airflow control within the plenum may be desired to help protect that seal.

Another variant of the invention is provision of two filter bags 118, 118' in parallel, each preferably with its respective canister 131, 131', and with selector valving 136 ganged 137 to switch over—from one bag 118 to the other 118'—the flow 18, 19 that originates in the dust-control plenum and leaves through the exhaust pump 132. This system can be used with or without the outer-canister arrangement (if without the canisters, then the downstream valve is unnecessary); and in either event facilitates orderly emptying or changeout of the filter bags without necessity for halting operation.

(j) Wet Collection of the Dust Residual

Alternative to dust collection in a container is the technique of weighting down the particles of dust with water droplets. As mentioned earlier, this technique has been in practice for an extended period of time, but has been limited to water-ring sprayers.

The amount of water used, or more to the point the amount of dilute silica slurry discharged, in such installations is excessive. The need has been long felt for a more tidy and professional resolution of severe dust-control problems, but nothing in the prior art has truly met this need.

We have introduced such a resolution in the form of an improved water scrubber for a gunite gun, using a water atomizer or mister 151 (FIGS. 20 through 26) instead of a water ring. This seemingly simple substitution produces an enormous difference in performance, as the atomizer provides much finer water particles.

The result is much lower water usage and, more importantly, a correspondingly lower volume of relatively dry—only damp—silica slurry. The amount discharged by our system is small enough to enable recapture in a modest tray or the like, if desired, or in principle even automated return to the material inlet of the gunite gun as indicated below.

For best results the fine orifices of the atomizer 151 must be protected against blocking by particulate materials in the water supply. Most atomizers that are commercially available can be procured with a built-in wire filter, but the filter itself is often too coarse to protect the mister adequately—and, even so, with many water supplies this element itself is likely to plug after a short time.

Restoration of the filter to a useful condition then requires disassembly of the atomizer. In field environments this is a highly undesirable operation.

After experimentation we believe that it is important to provide a more-suitable backup to the atomizer orifices—and to the built-in filter, if present. To be fully suitable, this backup must provide a finer filtration and also a significantly greater cross-sectional area than that of the built-in filter, and also must be quickly and easily cleaned out when it does eventually plug.

We have settled on a commercial trap of the type known as a "Y strainer". This device 157 includes a cartridge filter, readily removable through a side port 156 for cleaning or replacement.

The atomizer 151 itself should be installed substantially flush with the internal diameter of the exhaust line 146, 146A, 146B, 146C from the dust-control plenum. The exhaust line itself should be of adequate diameter for most effective reduction of air pressure at the pressure-relief point just above the wear plate.

In the case of a baffled plenum, as mentioned earlier, the lower pressure should enable restoration of the ideal baffle positioning just above the wear plate. This will enable maximum reduction of the amount of solid material actually to be handled—and therefore of the water volume needed, and thereby the amount of slurry requiring disposal later.

We have satisfied all these requirements with a very simple and economical system, using commonly available plumbing elements. In our preferred configuration these elements include a short, slightly downward-angled segment 141 of straight pipe, then a forty-five-degree elbow 142, a second short segment 143 of straight pipe, a second forty-five-degree elbow 144, a third short segment 145 of straight pipe and finally a tee 146, 148—with its straight-through portion 146, 146A, 146B (the crossbar of the tee) in-line with the previously enumerated components. As suggested in FIGS. 26 and 27, a custom piping section 146C with the necessary side port can be sized and bent for this purpose if preferred.

The atomization nozzle 151 is screwed into the side-port 148 (FIGS. 20 and 21) of the tee, so that the nozzle is nearly flush with the inside of the wall 146 of the straight-through portion. The nozzle projects the atomized water mist 152 generally across that straight-through portion, though in a conical pattern.

In the devising of this configuration, numerous other arrangements—at first seeming plausible, for those skilled in the art—were considered and rejected. For example, this configuration is much preferable to any system of pointing the main water stream upward, head-on into the oncoming stream of dust-and-air.

Such a head-on system may seem very appealing, and undoubtedly would work very well in many industrial environments. It would provide a simple way to obtain a relatively long path for collision of droplets with dust particles.

Our invention recognizes, however, that in a gunite machine such a system is likely to get water back into the dust-control plenum—leading to concealed setup of gunite in the plenum later when the machine is turned off. Later when an operator attempts to restart the machine, the result could be not only major difficulty in restarting but also severe damage to the machine, or at the very least to the pad.

The flush-crosswise-spray configuration (FIGS. 20 and 21) is also generally superior to a system of positioning a spray head within the air stream—as, for instance, spraying straight down from a position along the centerline of the air conduit. This arrangement would not be likely to spray water back into the dust-control plenum.

A down-spray system with spray head in the air stream would provide a long droplet-to-particle collision path, and thus may appear very promising. Once again, it is a system which could work, and work splendidly, in many industrial environments—as, for instance, petroleum stack scrubbers where the object is primarily to take down fumes.

In a gunite dispenser, however, gunite is likely to build up on the back of a stationary spray head, and with any moisture in the system the built-up material is likely to set. Once again the end result will be to choke off the exhaust passage with cement, rendering the dust-control system inoperative and leaving an awkward cleanout problem.

One useful variant is to mount the mister 151 off-axis in the tee 146A, 148A (FIGS. 22 and 23) to produce a swirling, spiral action 152A in the air stream, and therefore a longer path for knocking down dust particles. This may require a custom, or at any rate nonstandard, tee fitting 146A, 148A.

If desired the mister 151 may also, or alternatively, be mounted at a slight downward angle to the vertical in the tee 146B, 148B (FIG. 24). Angled mounting further lengthens the spiral path 152A if the mister is eccentric as just mentioned, or provides a somewhat lengthened path even if the mister is on-center.

In the side line 148–158 (FIG. 25) of the tee 146, 148, just behind the atomization nozzle 151, is the Y strainer 155 with its screen-cleanout port 156. Next in the side line behind the strainer is a hand-controlled valve 157, to interrupt the water supply 158 for strainer cleaning.

The two forty-five-degree elbows 142, 144 are advantageously used not only to redirect the airflow to vertical, but also partly to obtain a curving of the pipe sequence around the housing 61, so as to route the exhaust line through and around other hardware (not shown) that is clustered in the same area. Accordingly it is desirable that the fitting 63 which is fixed to the housing be canted, to angle the first pipe segment 141 slightly downward and leftward (clockwise, seen from above) from the housing 61.

Where the cost is warranted by demanding production schedules, we prefer to install a quick-disconnect at the housing-affixed fitting 63. With such a device in place, the entire pipe train can be quickly and easily removed and flushed clean with a water hose.

Water flow 158 to the atomizer 151 should be shut off whenever the rotary feed structure is halted; otherwise the dust in the pipe train sets, and flushing becomes impossible. In this regard we prefer to supplement the manual valve 157 with an automatic water shutoff (not shown), controlled by pressure in the air line that drives the rotary feed-structure airmotor.

Preferably the three short pipe segments 141, 143, 145 are all two-inch O. D. NPT nipples, the two elbows 142, 144 are both two-inch fittings, and the straight-through section 146 of the tee is two-inch-by-half-inch NPT. The atomizer 151 is an atomization nozzle number ¼LND2 available from Spraying Systems. The valve is a half-inch NPT unit, and the strainer also a half-inch NPT device with a forty-per-centimeter (one hundred per inch) mesh screen.

As already mentioned, the crosswise atomizer-spray configuration and its variants (FIGS. 20 through 25) are much more resistant to gunite setup than upward-spray geometries and any other systems that tend to allow water into the area above the spray device. Nevertheless we have found in some extraordinary situations that a build-up of gunite within the exhaust tube does occur, sometimes about 6 cm (2½ inches) above the spray unit. This occurrence was particularly associated with experiments using a fan-type spray nozzle, but is considered pertinent to atomizers and other sprayers as well.

This build-up can bridge across the inside of the tube, eventually choking off the scrubber system and rendering it ineffective. Under such circumstances in principle the pressure in the dust-control plenum could eventually approach that of the residual pressurization from the discharge chambers of the feed structure; at that point the pressure once again would be relieved largely through the particulate material in the hopper.

To deal with this we have found it beneficial to employ a flexible tube, rather than a rigidly mounted assembly of rigid pipe sections, as the exhaust tube. The tube is best made of a self-lubricating polymeric material such as polyurethane, to minimize the tendency of the particulate to stick to the inside wall of the exhaust tube, set up there, and plug the tube.

In case exhaust clogging nevertheless still does occur, the flexible tube can be flexed to break up the material so that it falls out, in pieces, through the bottom of the tube. To facilitate this breakup and removal, operating personnel can manually bend the flexible tube, or in difficult cases can kick the tube or strike it with a crowbar—with little risk of damaging any of the equipment.

Figure 26:
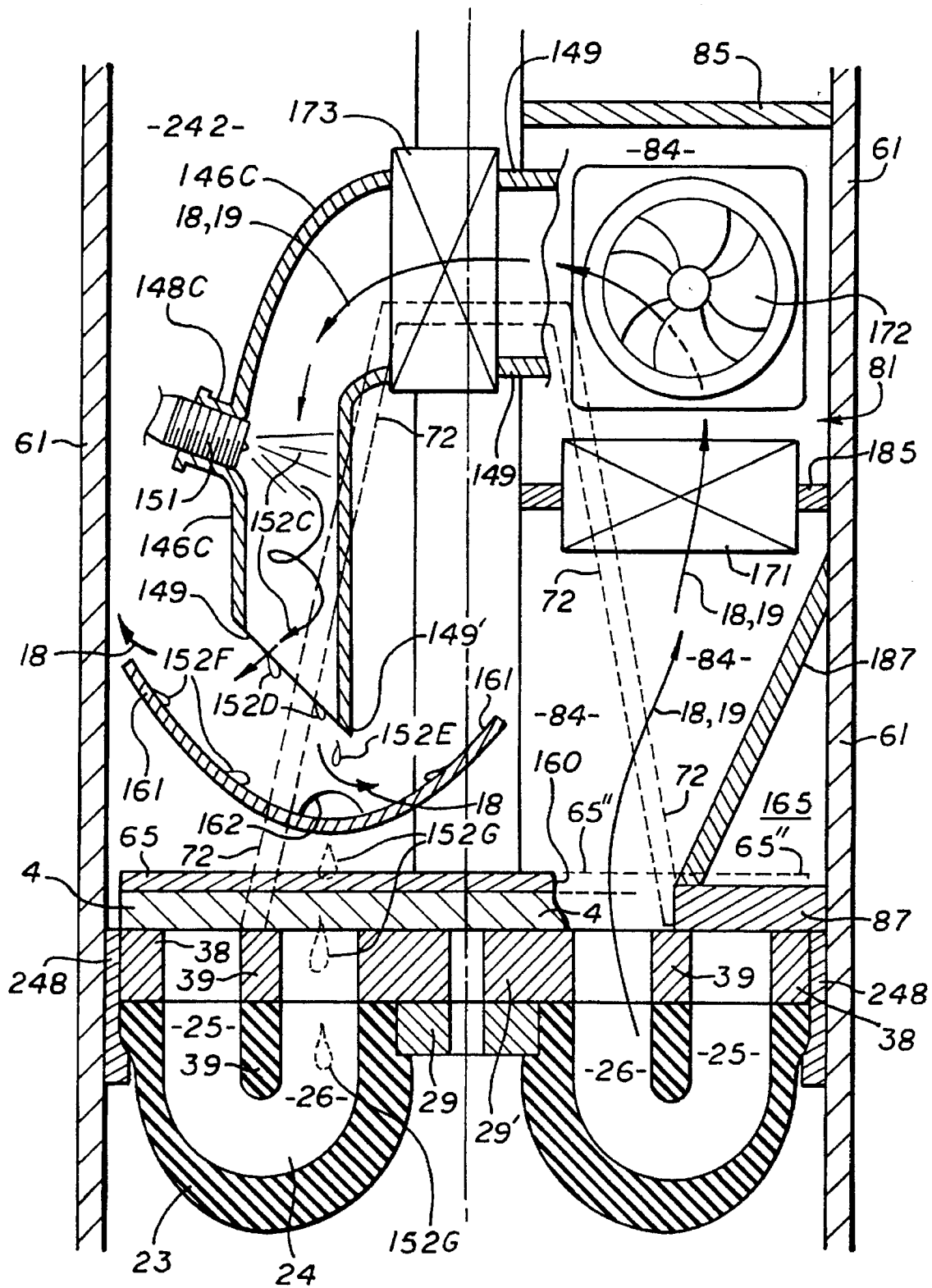
FIG. 26 is a highly schematic partly sectional elevation, an unfolded view taken along the dogleg line 26/27—26/27 of FIG. 3 and showing use of a misting apparatus, as in FIGS. 22 through 24, in combination with a dust-control plenum—in a material-recycling form of the invention (the upper-left quadrant of FIG. 26 shows the left-hand radial panel 242, but its upper-right quadrant is taken just behind the right-hand radial panel 243)
Figure 27:
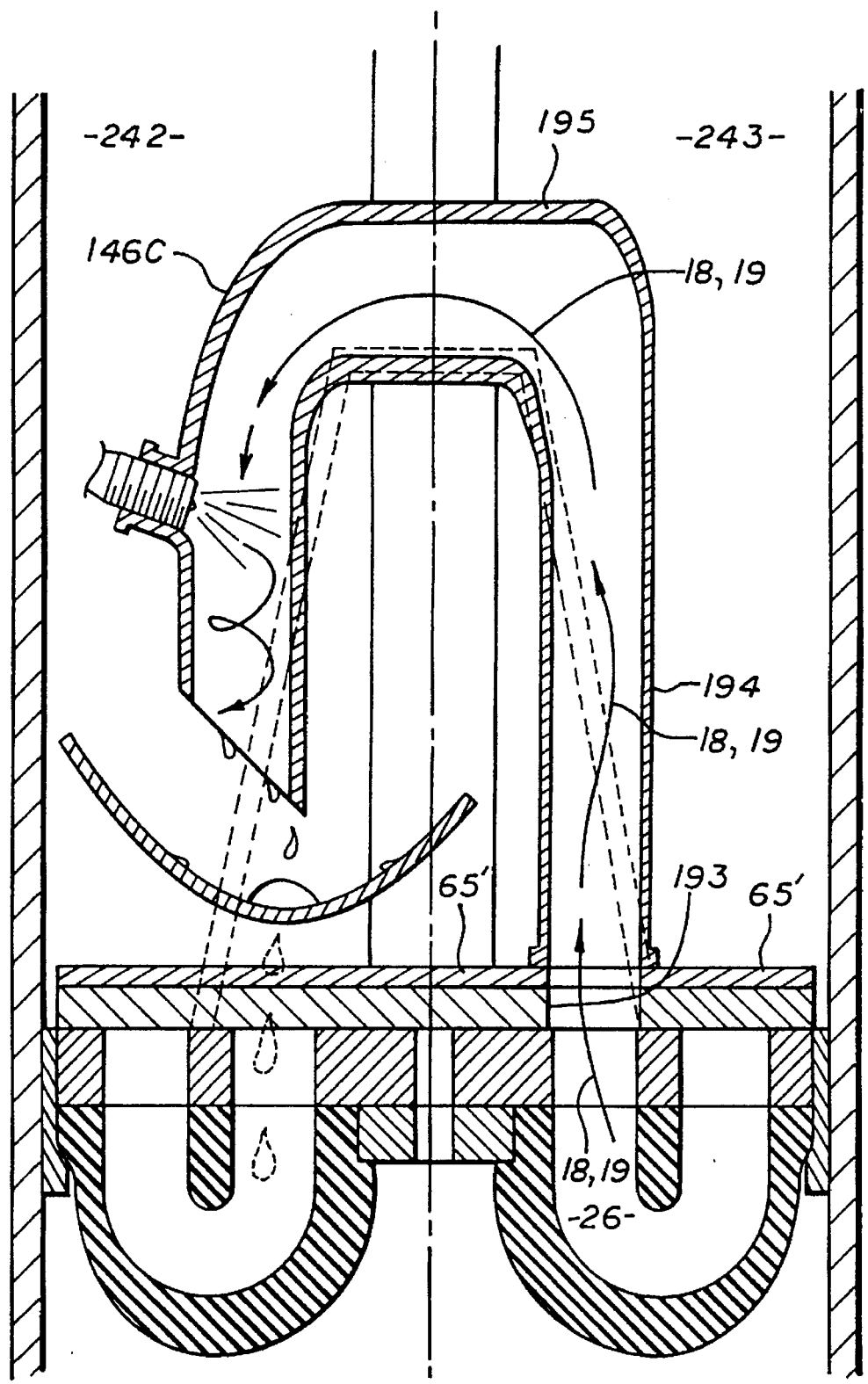
FIG. 27 is a like view showing the same misting apparatus in combination with a through-the-pad dust-control system—also in a material-recycling form of the invention (FIG. 27 shows both the left- and right-hand radial panels 242, 243).

Another refinement entails drawing down the pressure above the air-inlet end of each pocket in the dust-control plenum, through use of pumps or fans. Large, fast muffin fans 171, 172, 173 for instance can be mounted in the housing wall 61 at the plenum exhaust point 63, or in an internal bulkhead 185 (FIG. 26).

To minimize the likelihood of clogging due to gunite set-up—particularly in case moisture is present in the system—the fan blades are preferably of polyurethane or an equivalent self-lubricating material. Although shown here in the context of a water scrubber, drawdown fans are equally applicable to a bag-collection system as suggested earlier.

One purpose of such drawdown is to lower the pressure drop across the material baffle 87, thereby deterring high-speed escape of gunite particles through the narrow space between baffle and wear plate 38, 39—and so enabling the baffle to be closely fitted against that plate. Another purpose is to enhance the work of the baffle by further encouraging air exhaust through the air-inlet end 26 of each pocket 24–26.

As mentioned earlier, an auxiliary airflow baffle 187 may be provided to enhance equalization of the pressure above and below the main, gunite-material baffle 87, and still further enhance the selectivity of air exhaust from the air-inlet end.

(k) Recycling of Dust

Our invention contemplates arrangements for automated return of captured dust to the material-input end of the machine, for recycling into the deliverable flow of gunite. One particularly convenient return point for such a system is beneath the conical deflector 72, just to the left (i.e., counter to the direction of material flow) from the pad region and the left-hand radial wall 242.

Such a system in principle is compatible with a dry collection system, but may be more readily implemented with a water scrubber. The scrubber facilitates separation of the entrained material from the air flow—thus allowing return of exclusively the material to, or under, the input hopper without dust blowback through the hopper.

In the space below the cone 72 (FIGS. 26 and 27), the returned material can be introduced without interference from the abrasive flow of the mass of gunite in the radially outward portion of the hopper. (If preferred, however, a return aperture or pipe leading into the outer part of the hopper can be used—with a heavy shield to prevent damage or obstruction by material in the hopper.82384) Thus the return path from plenum 81, 84, 85 (if present, as in FIG. 26) to inlet pockets 26 is nearly all within the pie-shaped volume (see FIG. 1) of the machine above the pad 4 and clamping plate 65, and below the ceiling 241; and between the radial walls 242, 243.

Here the return pipe 149 (FIG. 26), rather than being routed outside the housing from the radially outward wall 61 of the plenum and housing, passes instead through the right-hand radial wall 243 (not shown in FIG. 26). The return pipe 149 then passes across the space above the pad 4 and clamping plate 65.

(In FIG. 26, for clarity of showing the plenum region, the pad 4 and plate 65 are drawn broken away at 160, and to the right of that point they are shown only in the phantom line 65". As will be recalled, the plenum is not above the pad; rather, each pocket leaves the pad before reaching the radial wall 243, and passes under the wall 243 before reaching the plenum. Thus the radial wall 243 separates the pad region from the plenum.)

In this way, the fraction of the residual material 18 which leaves each just-processed pocket 24 26 as airborne dust is made to rejoin the fraction of the same residual material which reins in the pocket and is carried by the feed structure back around to pass again under the pad.

For this type of system, with a dust-control plenum, the previously mentioned blower or fans (preferably with blades of polyurethane or equivalent) can be installed, as mentioned before, at 171 in a horizontal bulkhead 185 inside the plenum; or at 172 in the right-hand radial wall 243, just to right of the pad 4—or at 173 in the dust-exhaust line. The bottom end of the mister pipe may be angled 149 to a point 149', tending to concentrate 152D flow of the slurry 152E in a small region.

Below the end of the mister pipe is a broad, shallowly curved, gently inclined and preferably polymeric trough or flume 161, terminating at a small return hole 162 through the left-hand radial wall 242 and into the conical volume below the rock cone 72. In this way the material is led to drip 152G into the inner aperture 26 of each pocket, just before it rotates under the pad 4.

The flume 161 is broad and shallowly curved to facilitate (1) escape of the airflow 18 from the bottom of the mister pipe 149 to the open atmosphere, without developing significant backpressure; and (2) capture of the slurry 152E, 152F for passage through the return hole 162. The flume 161 also is angled (not shown) downward toward that hole 162 to discourage accumulation of the slurry 152F on the flume itself.

A closely similar system can be implemented by an arched path, as for example by tubing 194, 195 (FIG. 27), without a plenum but relying instead upon the through-the-pad dust-recovery system introduced earlier. In this case no fan or blower should be needed, as no felt-seal abrasion problem arises.

In the system of FIG. 26, pumping or fan-assisting of residual pressurized air from the plenum my result in excessive air speed in the vertical piping at the atomizer. If objectionable this can be corrected by placing a restriction in the line above the atomizer—but downstream, in the air flow, from the last fan.

Such a restriction may take the form of, for example, a set of baffles in the line. Such baffles are likely to accumulate a large build-up of dust. If so, to facilitate cleanout the baffles are advantageously placed in a removable pipe section, with quick disconnects.

To minimize gunite-dust sticking and clogging in the exhaust tube, and to facilitate breakup of any such material that does set and tend to bridge the tube, the exhaust piping 149, 195, 146C is advantageously made of flexible polyurethane or equivalent—at least 5 cm (2 inches) inside diameter, and installed with quick disconnects—as mentioned earlier.

(The recaptured slurry need not necessarily be returned by transport through the two radial walls and across the pie-shaped space above the pads as illustrated. Rather it can be returned into the space under the unperforated rock cone by passing instead through the far right-hand wall 84 [FIG. 2] of the plenum 81. In this case it is necessary to fit the mister itself, with its water connections and strainer, either within the plenum 81 or under the rock cone 72—or partly in each of these two spaces. In fact the pressurization-exhaust side of the plenum itself can in principle be under the rock cone. These alternatives, however, appear relatively unappealing for two reasons. First and most important, they my make access to the mister for cleaning, maintenance and water connections considerably more awkward. Second, they require active exhaust of the scrubbed air out from under the rock cone without releasing that air back into the hopper; it appears that this can be best done by pumping the air downward and out through the bottom of the machine.)

Ironically, the use of a water atomizer nozzle may be inconsistent with the two illustrated systems, as the nozzle produces a slurry that may be too dry to flow along the flume and through the return hole. This potential problem my not materialize, as the combined effects of the immediately adjacent airflow and the vibration inherent in operation of the machine may impel the slurry down the self-lubricating polymeric surface 161 and through the hole 162—before the slurry can set.

If not, two alternatives appear for inducing the slurry to complete its migration. One of these is to further extend the atomizer line horizontally so that it passes through the left-hand wall and terminates under the rock cone—and the slurry drops straight down into the inner apertures of the pockets. This is awkward because, again, it tends to release the pressurized air under the hopper, which is the originally objectionable release point.

The other alternative is much simpler: merely to restore a higher volume of water usage. This can be accomplished in a variety of ways, such as for example using a water ring or a fan spray instead of the atomizer.

It is even possible to retain the atomizer but provide an additional water flow down the flume 161, to carry the otherwise dry slurry down the flume and through the return port 162. This last alternative has the advantage of providing independent control of (1) the water volume needed to bring down all the dust and (2) the amount of water required to carry the material through the return port.

Preferably each of the two independently controlled water flows is made proportional to the rotational speed of the bowl, or otherwise to the throughput of particulate material being dispensed. This preference arises from the importance of maintaining a reasonable relationship between the amount of water and the amount of material expelled into the delivery tube—as may be most evident, for example, when the machine is stopped.

Independent control as just outlined can be used to pursue still another serendipitous advantage. Loading water into the inlet ends of the pockets, while the bulk gunite is loaded into the outlet ends, results in blowing the water into the gunite—in the pocket—before the gunite is even blown out of the pocket.

This amounts to a form of immediate predampening, and can have several highly important benefits. Predampening, as mentioned earlier, is usually effected by premixing in a cement mixer or the like—particularly for the purposes of (1) helping to homogenize the gunite before it reaches the delivery tube, (2) lubricate the material to reduce abrasion and thereby extend the service lives of the feed structure and the delivery line, and (3) begin its chemical hydration before it reaches the point where it is bulk-combined with water for spraying from the remote end of the delivery line.

It is unclear whether this form of immediate predampening can be refined to the point of making a significant contribution to the first and third of these three goals of conventional predampening—homogenization and hydration—but that is not an implausible result. If it can be achieved, then it is a very important result since it enables these valuable enhancements in gunite spraying without the additional expense (and in some environments impracticality) of a cement mixer.

Probably at least a beneficial lubrication—the second of the three objectives listed above—can be achieved by incorporating water flow into the dust-return system, even without close control of the water volume. Generally speaking, some benefit can be expected if the water mass is at or below about four percent of the gunite mass.

(1) Compressor/Dust-Control Integration

Still another approach to dust control recognizes that gunite dust is a problem because a compressor has stored energy in compressed air for the purpose of propelling gunite, and whatever portion of this energy is not used to propel gunite into the delivery tube is later released with entrained residual gunite. In principle this unused fraction of the stored energy—as well as the undelivered gunite—can be recovered and recycled.

In purest principle this can be accomplished by using the air intake of the compressor as a suction point for reducing the air pressure in the dust-control plenum—or in the through-the-pad pressure-relief line. Any such effort must be done with great care because, first, any such feedback arrangement is subject to oscillations; and without adequate design safeguards these oscillations can become uncontrolled abruptly, causing considerable damage and injury.

Second, if a common compressor such as one of the valved-reciprocating-piston type is in use, return of the dust-filled exhaust from the pockets to the compressor input may be expected to rapidly destroy the seals and precision surfaces of the compressor. Other compressor or pump types, such as for example peristaltic devices, may develop adequate pressure with immunity to such problems.

If the immunity is very high, residual pressurization—accounting for perhaps a third to a half of the original compression energy—may be returned to the system without any need for separating the dust at all. Poor efficiency of alternative pumps, however, may result in discarding much of the compression energy saved.

It will be understood that the foregoing disclosure is intended to be merely exemplary, and not to limit the scope of the invention—which is to be determined by reference to the appended claims.

What is claimed is:

1. A rotary feed structure for apparatus that conveys particulate material from a hopper to a delivery tube; said rotary feed structure comprising:

a substantially polymeric body defining multiple chambers in a generally circular array about an axis, said chambers having substantially polymeric surfaces for contacting such particulate material;

a metal wear plate fixed to the substantially polymeric body; and means for mounting the body in such a particulate-material conveying apparatus, for driven rotation about the axis.

2. The feed structure of claim 1, wherein:

the substantially polymeric body is bonded to the wear plate.

3. The structure of claim 2, wherein:

the substantially polymeric body is self-bonded to the wear plate.

4. The structure of claim 2, further comprising:

a metal axial spacer held adjacent to the wear plate.

5. The structure of claim 4, wherein:

the spacer is at least partially embedded in the body; and the mounting means are, at least in part, integral with the spacer.

6. The structure of claim 1, wherein:

the mounting means are, at least in part, integral with the wear plate.

7. The feed structure of claim 1, wherein:

the body is of a rotary feed-bowl type; and the chambers are generally U-shaped pockets.

8. The feed structure of claim 1, wherein:

the body is substantially of polyurethane.

9. The structure of claim 8, wherein:

the polyurethane is formed primarily from material commercially available as Uniroyal L-167 or B-601, or equivalent.

10. The structure of claim 8, wherein:

the wear plate is of a material commercially known as "Ni-hard".

11. The rotary feed structure of claim 1, wherein:

the wear plate defines apertures, for passage of such particulate material, and the apertures have walls;

no polymeric coating, but at most flash, is formed on said wear-plate aperture walls;

a metal axial spacer plate is held adjacent to the wear plate;

the spacer plate does not extend to the chambers, but rather is only within an inner radius of the chambers;

a wall thickness of at least 1½ to 2½ cm (five-eighths to one inch) is present at all points between the spacer plate and the chambers; and no radial air-leakage path is present between the body and the wear plate.

12. The rotary feed structure of claim 1, wherein said body is formed by the steps of:

a) assembling a generally circular array of arch-shaped mold cores, for defining a generally circular array of inverted U-shaped pockets serving as particulate-material conveying chambers in the feed structure, whereby the feed structure is of a rotary bowl type, said array of cores having a periphery and a center, and each core having:

a pair of discrete, generally straight but very slightly tapered legs, for forming a corresponding pair of particulate-material entry and exit conduits in the feed structure, and a generally flat-bottomed header that is generally circular in elevation and tapered in plan, spanning the legs to complete a pocket by forming a connecting cross-passage in the feed structure between the conduits;

b) positioning an outer mold form about the periphery of the mold-core array;

c) positioning a central mold form at the center of the mold-core array, for cooperating with the outer mold form to create a very-generally-annular mold cavity;

d) preparing a batch of polymer;

e) then pouring the polymer into the mold cavity;

f) then curing the polymer to solidify it and so create the feed structure; and g) then demolding the feed structure from the forms and cores.

13. A rotary feed structure for apparatus that conveys particulate material from a hopper to a delivery tube; said rotary feed structure comprising:

a substantially polymeric body defining multiple chambers in a generally circular array about an axis, said chambers having substantially polymeric surfaces for contacting such particulate material;

a metal plate fixed to the substantially polymeric body, said plate having apertures for passage of such particulate material, and the apertures having walls; and means for mounting the body in such a particulate-material conveying apparatus, for driven rotation about the axis; and wherein no polymeric coating, but at most flash, is formed on said plate aperture walls.

14. The structure of claim 13 wherein:

any polymeric material along said plate aperture walls is less than about 1½ mm (0.060 inch) thick.

15. The structure of claim 13, wherein:

any polymeric material along said plate aperture walls is about three-quarters of a millimeter (0.030 inch) thick, or less.

16. A rotary feed structure for apparatus that conveys particulate material from a hopper to a delivery tube; said rotary feed structure comprising:

a substantially polymeric body defining multiple chambers in a generally circular array about an axis, said chambers having substantially polymeric surfaces for contacting such particulate material;

a metal plate fixed to the substantially polymeric body but not extending to the chambers, and being only within an inner radius of the array of chambers about the axis; and means for mounting the body in such a particulate-material conveying apparatus, for driven rotation about the axis.

17. The structure of claim 16, wherein:

a wall thickness of at least 1½ to 2½ cm (five-eighths to one inch) is present at all points between the metal plate and the chambers.

18. Apparatus for conveying particulate material; said apparatus comprising:

a hopper;

a delivery tube;

a substantially polymeric rotary feed-structure body defining multiple chambers, for successive rotation into positions for receiving such particulate material from the hopper and positions for delivering such particulate material into the delivery tube;

said feed-structure chambers having substantially polymeric surfaces for contacting such particulate material;

means for supporting and rotating the feed structure;

means for expelling such particulate material from the chambers into the tube;

means for selectively sealing the chambers to the expelling means and delivery tube;

a metal wear plate fixed to the substantially polymeric body; and transport means for carrying the hopper, the tube, the body, and the supporting, expelling and sealing means.

19. The apparatus of claim 18, wherein:

the substantially polymeric body is bonded to the metal wear plate.

20. The apparatus of claim 19, wherein:

the body is self-bonded to the plate.

21. The apparatus of claim 18, wherein:

the body is substantially of polyurethane; and the plate is of a material commercially known as "Ni-hard".

22. The apparatus of claim 18, further comprising:

means for restricting said receiving of such material from the hopper.

23. The apparatus of claim 22, wherein:

the body has an axis of rotation;

the expelling means comprise a source of pressurized gas;

each of said chambers comprises a pocket having a gas inlet and a gas outlet; and the restricting means are disposed to:

block the gas inlet against said receiving of material from the hopper, and leave the gas outlet substantially open for said receiving of material from the hopper.

24. The apparatus of claim 23, wherein:

the gas inlets are in an array about the axis; and the restricting means comprise a substantially unperforated cone disposed about the axis.

25. The apparatus of claim 18:

wherein the expelling means comprise a source of pressurized gas; and further comprising means for venting gas pressure from each chamber, when that chamber is in neither a delivering position nor a receiving position.

26. The apparatus of claim 18, wherein:

the expelling means comprise a source of pressurized gas; and each of said chambers comprises a pocket having a gas inlet; and further comprising means for venting gas pressure selectively from the gas inlet of each chamber.

27. The apparatus of claim 18:

wherein the expelling means comprise a source of pressurized gas; and each of said chambers comprises a pocket having a gas inlet; and further comprising means for venting gas pressure selectively from the gas inlet of each chamber, when that chamber is in neither a delivering position nor a receiving position.

28. The apparatus of claim 18:

wherein the expelling means comprise a source of pressurized gas; and further comprising a plenum, distinct from the receiving and delivering positions, for collecting residual air pressure and particulate material from the chambers.

29. The apparatus of claim 18, wherein:

the expelling means comprise a source of pressurized gas; and further comprising;

means for selectively sealing the chambers, when in said delivering positions, to the expelling means and delivery tube; each chamber comprising a pocket having a gas inlet and a gas outlet; and means for venting gas pressure selectively from the gas inlet of each chamber.

30. The apparatus of claim 18, wherein:

the expelling means comprise a source of pressurized gas; and further comprising:

means defining a dust-capture exhaust line for guiding residual pressurized air, and dust entrained therein, from the chambers to outside atmosphere after the chambers leave the delivering positions;

an atomizing nozzle disposed in the dust-capture exhaust line; and means for supplying water for atomization by the nozzle.

31. Apparatus for conveying particulate material; said apparatus comprising:

a hopper;

a delivery tube;

a substantially polymeric rotary feed-structure body defining multiple chambers, for successive rotation into positions for receiving such particulate material from the hopper and positions for delivering such particulate material into the delivery tube;

said feed-structure chambers having substantially polymeric surfaces for contacting such particulate material;

means for supporting and rotating the feed structure;

means for expelling such particulate material from the chambers into the tube;

means for selectively sealing the chambers to the expelling means and delivery tube;

a metal wear plate generally next to the substantially polymeric body;

means for substantially eliminating any leakage path, for air or such particulate material, between the wear plate and the polymeric body; and transport means for carrying the hopper, the tube, the body, and the supporting, expelling and sealing means.

32. In combination:

a rotary feed structure for apparatus that conveys particulate material from a hopper to a delivery tube; said rotary feed structure comprising:

a substantially polymeric body defining multiple chambers in a generally circular array about an axis, said chambers having substantially polymeric surfaces for contacting such particulate material, and means for mounting the body in such a particulate-material conveying apparatus, for driven rotation about the axis;

a metal wear plate substantially next to the substantially polymeric body; and means for substantially eliminating any leakage path, for air or such particulate material, between the wear plate and the body.

33. Apparatus for conveying particulate material; said apparatus comprising:

a hopper;

a delivery tube;

a substantially polymeric rotary feed-structure body defining multiple chambers, for successive rotation into positions for receiving such particulate material from the hopper and positions for delivering such particulate material into the delivery tube;

said feed-structure chambers having substantially polymeric surfaces for contacting such particulate material;

means for supporting and rotating the feed structure;

means for expelling such particulate material from the chambers into the tube;

means for selectively sealing the chambers to the expelling means and delivery tube;

a metal plate fixed to the substantially polymeric body but not extending to the chambers, and being only within an inner radius of the array of chambers about the axis; and transport means for carrying the hopper, the tube, the body, and the supporting, expelling and sealing means.

34. The apparatus of claim 33, wherein:

a wall thickness of at least 1½ to 2½ cm (five-eighths to one inch) is present at all points between the metal plate and the chambers.

* * * * *